(12) United States Patent
Shingu et al.

(10) Patent No.: US 11,388,328 B2
(45) Date of Patent: Jul. 12, 2022

(54) IMAGING APPARATUS, CONTROL DEVICE, AND IMAGING SYSTEM

(71) Applicant: Panasonic Intellectual Property Management Co., Ltd., Osaka (JP)

(72) Inventors: Yasuhiro Shingu, Osaka (JP); Hironori Nakano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/148,667

(22) Filed: Jan. 14, 2021

(65) Prior Publication Data

US 2021/0218881 A1    Jul. 15, 2021

(30) Foreign Application Priority Data

Jan. 15, 2020  (JP) .............................. JP2020-004048
Nov. 26, 2020  (JP) .............................. JP2020-196315

(51) Int. Cl.
*H04N 5/232*     (2006.01)
*G06F 3/0362*    (2013.01)
*H04N 9/04*      (2006.01)

(52) U.S. Cl.
CPC ..... *H04N 5/23206* (2013.01); *H04N 5/23296* (2013.01)

(58) Field of Classification Search
CPC .......... H04N 5/23206; H04N 5/23296; H04N 5/23241; H04N 5/232933; H04N 9/045; H04N 5/232; H04N 5/23203; H04N 5/23212; H04N 5/23225; G06F 3/0362
See application file for complete search history.

(56) References Cited

U.S. PATENT DOCUMENTS

| | | | |
|---|---|---|---|
| 8,264,557 B2* | 9/2012 | Gocho | G08C 17/00 348/375 |
| 2012/0011456 A1 | 1/2012 | Noda | |
| 2017/0262708 A1* | 9/2017 | Wang | G06F 3/04815 |
| 2020/0045416 A1* | 2/2020 | Kamio | G01H 3/125 |

FOREIGN PATENT DOCUMENTS

| | | |
|---|---|---|
| JP | 2005-323163 A | 11/2005 |
| JP | 2011-130091 A | 6/2011 |
| JP | 2012-018535 A | 1/2012 |
| JP | 2015-002471 A | 1/2015 |

* cited by examiner

*Primary Examiner* — Christopher K Peterson
(74) *Attorney, Agent, or Firm* — Renner, Otto, Boisselle & Sklar, LLP

(57) ABSTRACT

An imaging apparatus capable of communicating with an external control device and configured to capture a subject image formed via an optical member includes a communication interface and a controller, wherein the controller starts the driving of the optical member based on a first command received from the control device via the communication interface, and wherein when the communication interface receives from the control device a second command different from the first command before completion of driving control of the optical member, the controller updates a target position as a target of driving the optical member based on the second command.

16 Claims, 18 Drawing Sheets

Fig.8A

|  |  | INF | 10m | 5m | 3m | 2m | 1.5m | 1.3m | 1m | 0.9m |
|---|---|---|---|---|---|---|---|---|---|---|
| FOCUS LENGTH | 14 mm | 0 | 1000 | 2000 | 3000 | 4000 | 5000 | 6000 | 8000 | 10000 |
|  | 25 mm | 100 | 1600 | 3200 | 4600 | 6100 | 7600 | 9100 | 12100 | 15100 |
|  | 50 mm | 200 | 3200 | 6200 | 9200 | 12200 | 15200 | 18200 | 24200 | 30200 |

UNIT:MOTOR step

Fig.8B

| FOCUS MOTOR DRIVING MAXIMUM SPEED INFORMATION | 30step/ msec |
|---|---|
| FOCUS MOTOR DRIVING MINIMUM SPEED INFORMATION | 3step/msec |

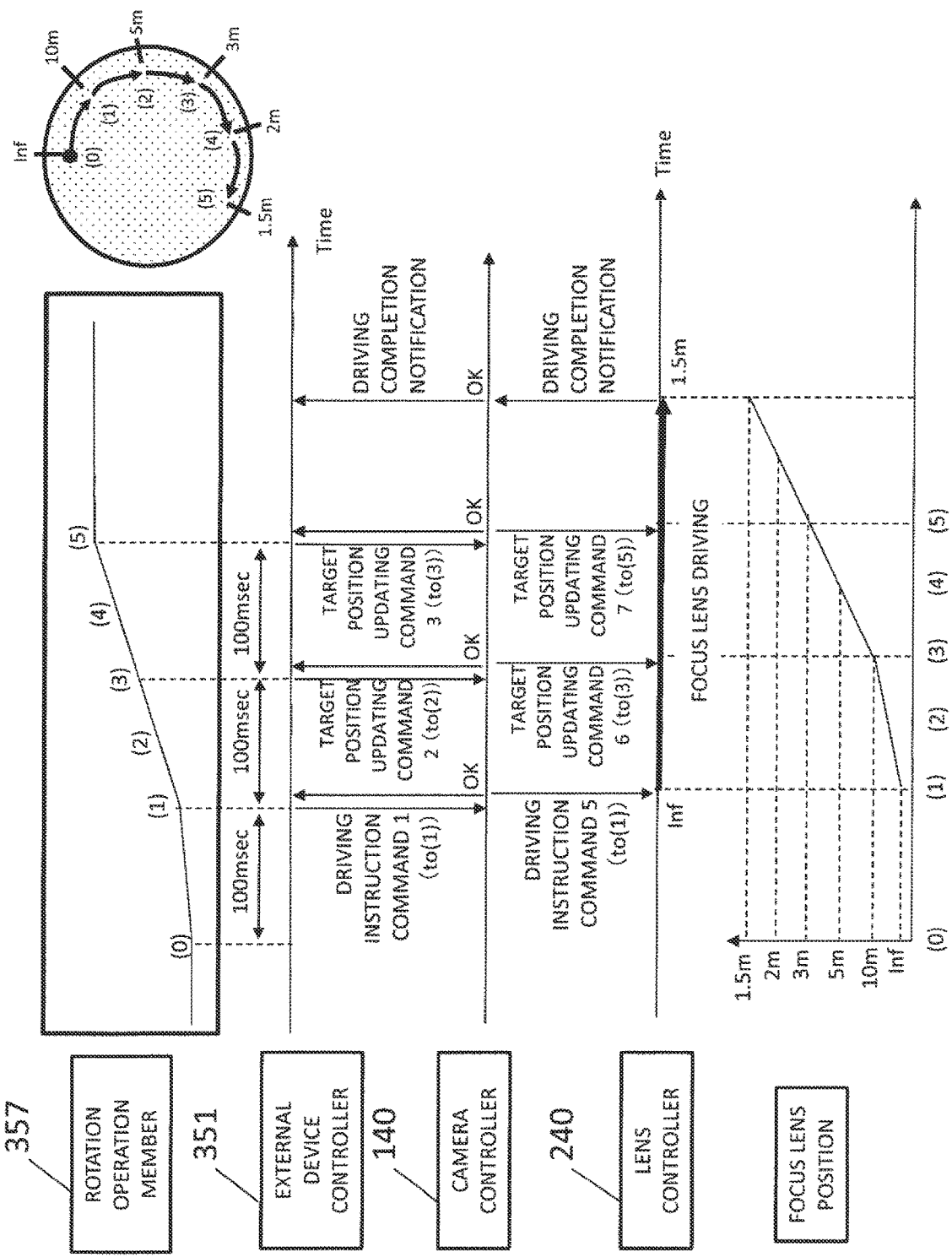

UNIT:MOTOR step

| STOP MOTOR DRIVING MAXIMUM SPEED INFORMATION | 10step/ msec |
|---|---|
| STOP MOTOR DRIVING MINIMUM SPEED INFORMATION | 2step/msec |

Fig.15A

| | 14 mm | 14.1 mm | 14.2 mm | 14.3 mm | 14.4 mm | 14.5 mm | | 50 mm |
|---|---|---|---|---|---|---|---|---|
| ZOOM MOTOR POSITION | 0 | 80 | 160 | 230 | 300 | 365 | | 4845 |

UNIT:MOTOR step

Fig.15B

| ZOOM MOTOR DRIVING MAXIMUM SPEED INFORMATION | 20step/ msec |
|---|---|
| ZOOM MOTOR DRIVING MINIMUM SPEED INFORMATION | 4step/msec |

# IMAGING APPARATUS, CONTROL DEVICE, AND IMAGING SYSTEM

TECHNICAL FIELD

The present disclosure relates to an imaging apparatus, a control device capable of communicating with the imaging apparatus, and an imaging system including the imaging apparatus and the control device.

BACKGROUND

A technology for remotely operating an imaging apparatus by using another electronic control device has been known. For example, JP 2015-2471 A discloses a technology for quickly setting specific parameters such as driving amount of a focus lens of an imaging apparatus by a touch operation in an imaging system in which the imaging apparatus and a smartphone are combined.

SUMMARY

Incidentally, when a cut of a specific scene of a movie is captured by a cinema camera, it is necessary to set a desired focus state or zoom state. In JP 2015-2471 A, since the driving amount of the focus lens of the imaging apparatus is set by the touch operation, it is difficult to set a target position of the focus lens for obtaining a desired focus state.

An object of the present disclosure is to provide an imaging apparatus, a control device, and an imaging system that is easy to drive a lens member to a target position with reflecting user intention.

An imaging apparatus according to the present disclosure is an imaging apparatus capable of communicating with an external control device and configured to capture a subject image formed via an optical member, the imaging apparatus comprising: a communication interface configured to receive from the control device a command related to driving of the optical member; and a controller configured to control the driving of the optical member based on the command, wherein the controller starts the driving of the optical member based on a first command received from the control device via the communication interface, and wherein when the communication interface receives from the control device a second command different from the first command before completion of driving control of the optical member, the controller updates a target position as a target of driving the optical member based on the second command.

A control device according to the present disclosure is a control device capable of communicating with an imaging apparatus configured to capture a subject image formed via an optical member, the control device comprising: an operation member movable according to user operation; a controller configured to generate a command related to driving of the optical member according to a movement operation of the operation member; and a communication interface configured to transmit the command to the imaging apparatus, wherein when the movement operation of the operation member is started, the controller generates a first command for starting the driving of the optical member and then transmits the first command to the imaging apparatus via the communication interface, and wherein during the movement operation being continued, the controller generates a second command for updating a target position as a target of driving the optical member and then transmits the second command to the imaging apparatus via the communication interface.

An imaging system according to the present disclosure includes an imaging apparatus configured to capture a subject image formed via an optical member; and a control device capable of communicating with the imaging apparatus, wherein the imaging apparatus includes a first communication interface configured to receive a command related to driving of the optical member from the control device, and a first controller configured to control the driving of the optical member based on the command, the control device includes an operation member movable according to user operation, a second controller configured to generate the command according to a movement operation of the operation member, and a second communication interface configured to transmit the command to the imaging apparatus, wherein when the movement operation of the operation member is started, the second controller in the control device generates a first command for starting the driving of the optical member and then transmits the first command to the imaging apparatus via the second communication interface, wherein during the movement operation being continued, the second controller generates a second command for updating a target position as a target of driving the optical member and then transmits the second command to the imaging apparatus via the second communication interface, and the first controller in the imaging apparatus starts the driving of the optical member based on the first command received from the control device via the first communication interface, and updates the target position as the target of driving the optical member based on the second command different from the first command when the first communication interface receives the second command from the control device before the driving control of the optical member is completed.

According to the imaging apparatus, the control device, and the imaging system according to the present disclosure, it is easy to drive the lens member to the target position with reflecting user intention.

BRIEF DESCRIPTION OF THE DRAWINGS

FIG. 8A is a diagram illustrating an example of focus table data as the lens data;

FIG. 8B is a diagram illustrating an example of focus speed information as the lens data;

FIG. 12C is a diagram illustrating the graph of FIG. 12B and the graph of FIG. 5 added thereto;

FIG. 15A is a diagram illustrating an example of zoom table data as the lens data; and FIG. 15B is a diagram illustrating an example of zoom speed information as the lens data.

DETAILED DESCRIPTION

Figure 1:
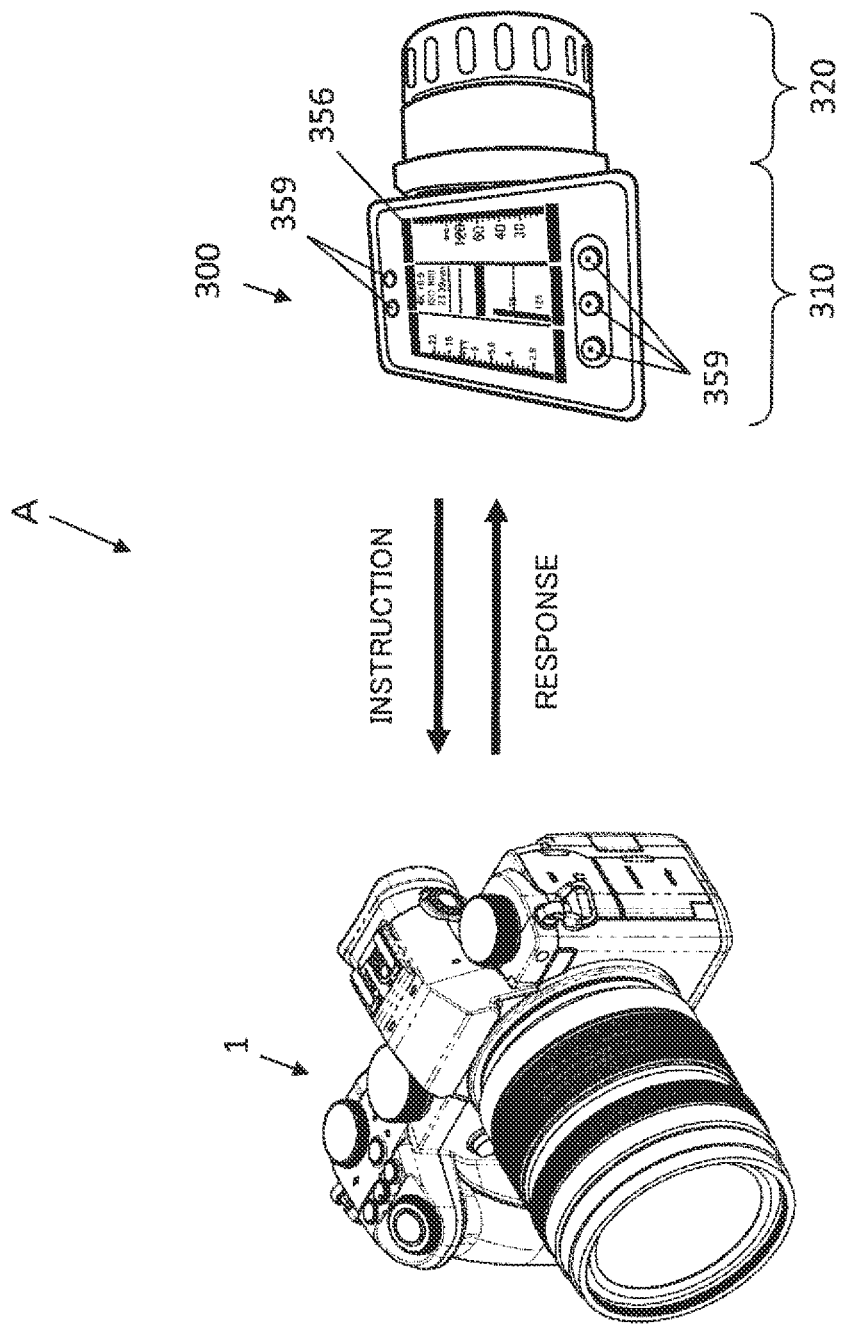
FIG. 1 is a diagram illustrating an imaging system of a digital camera 1 and an external device 300.

Hereinafter, an embodiment will be described in detail while appropriately referring to the drawings. However, unnecessarily detailed description may be omitted. For example, detailed descriptions of already well-known matters and redundant descriptions for substantially the same configuration may be omitted. This is to avoid unnecessary redundancy of the following description and to facilitate the understanding of those skilled in the art.

The applicant provides the accompanying drawings and the following description in order for those skilled in the art to fully understand the present disclosure, and do not intend to limit the subject matter described in the claims by the accompanying drawings and the following description.

Embodiment

1. Configuration

Hereinafter, a configuration of a remote imaging system of the present embodiment will be described with reference to the drawings.

1-1. Configuration of Remote Imaging System

FIG. 1 is a diagram illustrating a configuration of a remote imaging system of the present embodiment. As illustrated in FIG. 1, an imaging system A of the present embodiment includes a digital camera 1 and an external device (external communication device or control device) 300.

The external device 300 is an external control device capable of communicating with the digital camera 1. The external device 300 includes a wireless communication interface 310 and a dial part 320. The wireless communication interface 310 includes a liquid crystal monitor 356, an operation member 359, and the like.

The external device 300 is capable of giving instructions (remote operations) to the digital camera 1 such as a focus operation, a zoom operation, a stop operation, and a release button press for the digital camera 1 via the communication interface 310 of the external device 300. The digital camera 1 receives the instructions from the external device 300 via a communication interface of the digital camera, and then operates according to the received instructions.

That is, the present disclosure provides the imaging system A that enables remote operations (focus operation, zoom operation, release operation, and the like) for the digital camera 1 from the external device 300.

1-2. Configuration of Camera Body

Figure 2:
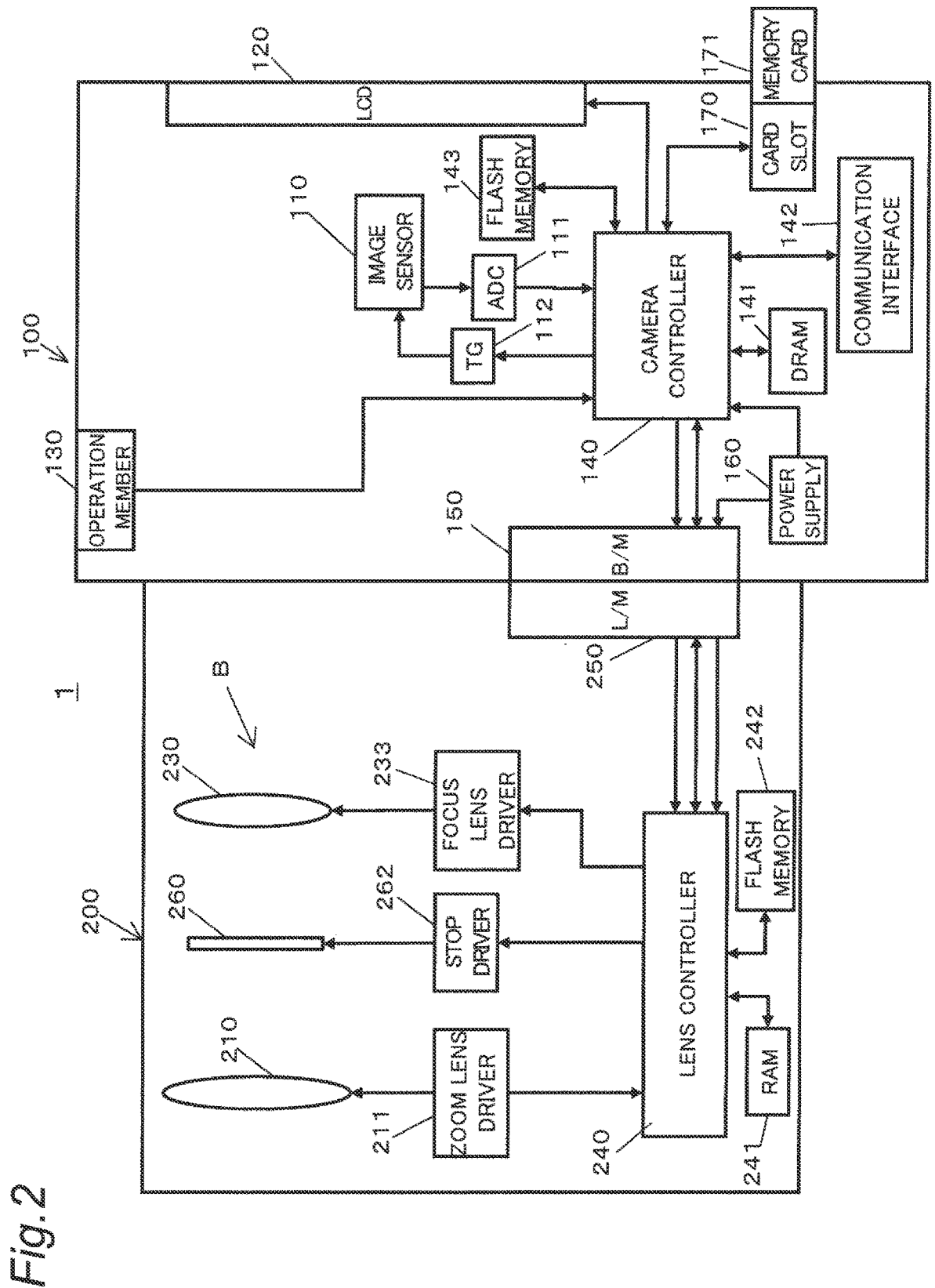
FIG. 2 is a block diagram illustrating a configuration of the digital camera 1 according to an embodiment of the present disclosure.

FIG. 2 is a block diagram illustrating a configuration of the digital camera 1 according to the embodiment. The digital camera 1 of the present embodiment includes a camera body 100 and an interchangeable lens 200. The interchangeable lens 200 is attachable to the camera body 100 and detachable from the camera body 100.

The camera body 100 (an example of an imaging apparatus) includes an image sensor 110, a liquid crystal monitor 120, an operation member 130, a camera controller 140, a body mount 150, a power supply 160, and a card slot 170.

The camera controller 140 controls the operations of the entire digital camera 1 by controlling components such as the image sensor 110 according to an instruction from the operation member 130. The camera controller 140 transmits a vertical synchronization signal to a timing generator 112. In parallel with the transmission of the signal, the camera controller 140 generates an exposure synchronization signal. The camera controller 140 periodically transmits the generated exposure synchronization signal to a lens controller 240 via the body mount 150 and a lens mount 250. The camera controller 140 uses a DRAM 141 as a work memory during a control operation and an image processing operation.

The image sensor 110 is an element configured to capture a subject image incident through the interchangeable lens 200 to generate image data. The image sensor 110 is, for example, a CMOS image sensor. The generated image data is digitized by an AD converter 111. The camera controller 140 performs predetermined image processing on the digitized image data. The predetermined image processing is, for example, gamma correction processing, white balance correction processing, flaw correction processing, YC conversion processing, electronic zoom processing, and JPEG compression processing. The image sensor 110 may be a CCD, an NMOS image sensor, or the like.

The image sensor 110 operates at a timing controlled by the timing generator 112. The image sensor 110 generates a still image, a moving image, or a live preview image for recording. The live preview image is mainly the moving image, and is displayed on the liquid crystal monitor 120 for a user to decide a composition for capturing a still image.

The liquid crystal monitor 120 displays an image such as the live preview image and various kinds of information such as a menu screen. Instead of the liquid crystal monitor, another type of display device, for example, an organic EL display device may be used.

A communication interface 142 is a wireless or wired communication interface. In the present embodiment, the camera controller 140 is capable of transmitting to the external device 300 lens information (performance data) of a focus lens 230, driving ability information of a focus lens driver 233, information regarding a communication period with an external equipment, and the like, by using Picture Transfer Protocol (PTP) with USB communication via the communication interface 142.

The operation member 130 includes various operation members such as a release button for instructing start of imaging, a mode dial for setting a shooting mode, and a power switch.

A flash memory 143 functions as an internal memory for recording image data and the like. The flash memory 143 stores programs regarding autofocus control (AF control) and communication control as well as programs for overall control of operation of the entire digital camera 1 and information regarding a communication period with external equipment.

A memory card 171 is attachable to the card slot 170 and is controlled by the camera controller 140. The digital camera 1 is able to store image data in the memory card 171 and also read out the image data from the memory card 171.

The power supply 160 is a circuit to supply power to each element in the digital camera 1.

The body mount 150 can be mechanically and electrically connected to the lens mount 250 of the interchangeable lens 200. The body mount 150 is able to transmit data to the interchangeable lens 200 via the lens mount 250 and to receive data from the interchangeable lens 200 via the lens mount 250. The body mount 150 transmits the exposure synchronization signal received from the camera controller 140 to the lens controller 240 via the lens mount 250. The body mount 150 transmits other control signals received from the camera controller 140 to the lens controller 240 via the lens mount 250. The body mount 150 transmits the signal received from the lens controller 240 via the lens mount 250 to the camera controller 140. The body mount 150 supplies the power from the power supply 160 to the entire interchangeable lens 200 via the lens mount 250.

1-3. Configuration of Interchangeable Lens

The interchangeable lens 200 includes an optical system B, the lens controller 240, and the lens mount 250. The optical system B includes a zoom lens 210, the focus lens 230, and a stop 260. The zoom lens 210, the focus lens 230, and the stop 260 are all optical members for forming a subject image captured by the image sensor 110 of the digital camera 1.

The zoom lens 210 is a lens for changing a magnification of the subject image formed by the optical system B. The zoom lens 210 is composed of one or a plurality of lenses. The zoom lens 210 is driven by a zoom lens driver 211. The zoom lens driver 211 includes a zoom ring operable by the user. Alternatively, the zoom lens driver 211 may include a zoom lever and an actuator or a motor. The zoom lens driver 211 moves the zoom lens 210 along an optical axis direction of the optical system B according to user operation.

The focus lens 230 is a lens for changing a focus state of the subject image formed on the image sensor 110 by the optical system B. The focus lens 230 is composed of one or a plurality of lenses. The focus lens 230 is driven by the focus lens driver 233.

The focus lens driver 233 includes an actuator or a motor to move the focus lens 230 along an optical axis of the optical system B based on control by the lens controller 240.

The focus lens driver 233 may be achieved by a DC motor, a stepping motor, a servo motor, an ultrasonic motor, or the like.

The stop 260 adjusts an amount of light incident on the image sensor 110. The stop 260 is driven by a stop driver 262 to control a size of an opening of the stop 260. The stop driver 262 includes a motor or an actuator.

The camera controller 140 and the lens controller 240 may be achieved by a hardwired electronic circuit, a microcomputer using a program, or the like. For example, the camera controller 140 and the lens controller 240 may be achieved by a processor such as a CPU, an MPU, a GPU, a DSP, an FPGA, or an ASIC.

1-4. Configuration of External Device

Figure 3:
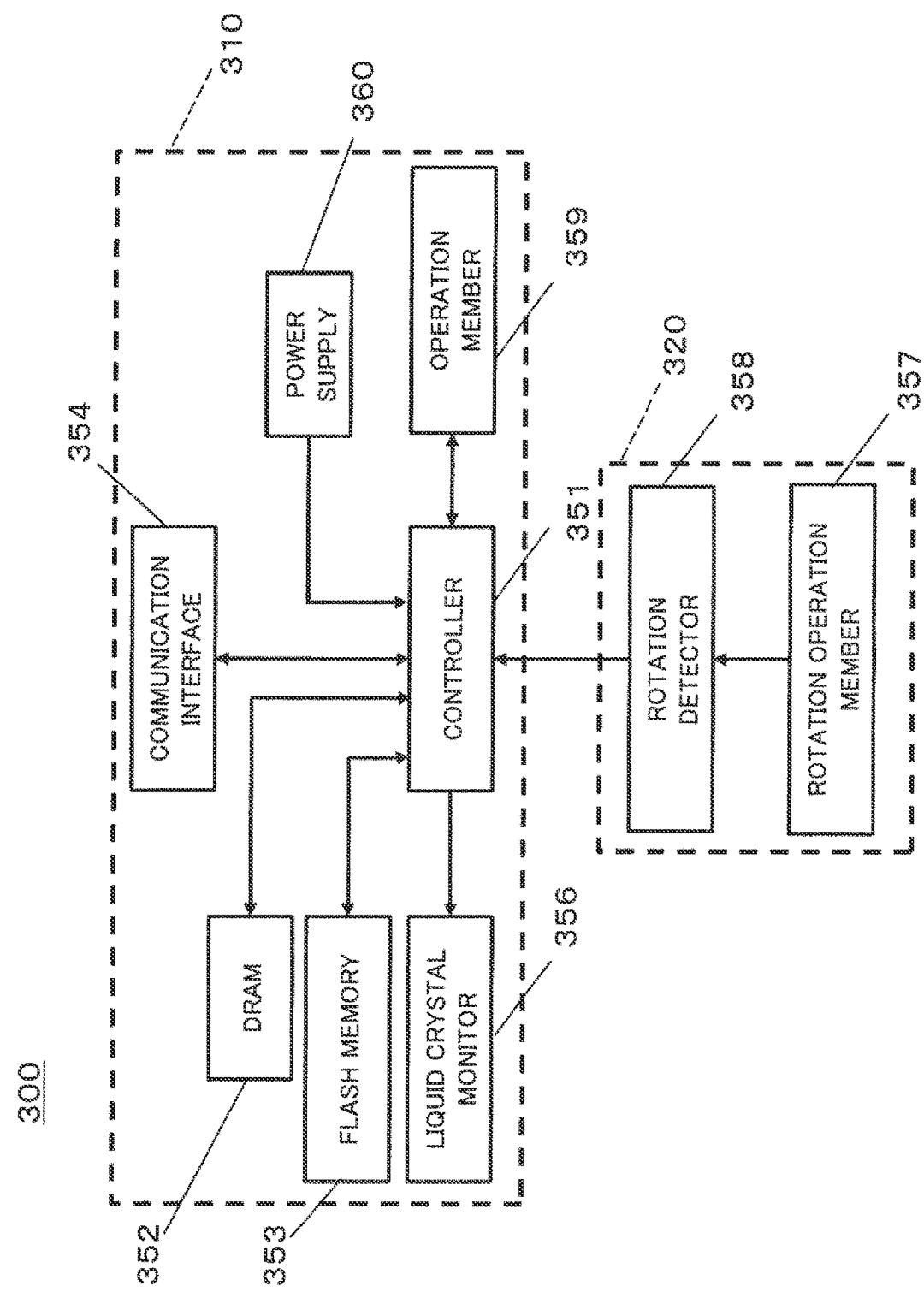
FIG. 3 is a block diagram illustrating a configuration of the external device 300 according to the embodiment of the present disclosure.

FIG. 3 is a block diagram illustrating a configuration of the external device 300. The configuration of the external device 300 will be described with reference to FIG. 3 below.

The external device 300 includes the wireless communication interface 310 and the dial part 320. The wireless communication interface 310 includes a controller 351, a DRAM (work memory) 352, a flash memory 353, a communication interface 354, the liquid crystal monitor 356, the operation member 359, and a power supply 360. The dial part 320 is an operation member including a rotation operation member 357 and a rotation detector 358.

The controller 351 is a processing unit configured to control processing in the external device 300 as a whole. The controller 351 is electrically connected to the DRAM 352, the flash memory 353, the communication interface 354, the liquid crystal monitor 356, the rotation detector 358, and the operation member 359. The controller 351 accepts operation information indicating an operation of the user via the operation member 359. The operation member 359 includes various operation members such as buttons for selecting the focus operation, the zoom operation, or the stop operation for the remote operation, a release button for instructing start of imaging, and the power switch. The controller 351 is capable of reading out data stored in the flash memory 353. The controller 351 also controls power supplied to each unit of the external device 300 from the power supply 360.

The DRAM 352 is a memory configured to temporarily store information necessary for the controller 351 to execute various processing operations.

The flash memory 353 is a large-capacity non-volatile memory for storing various kinds of data. As described above, various kinds of data stored in the flash memory 353 can be read out by the controller 351.

The controller 351 acquires lens data (information of the focus lens 230 and driving ability information of the driver 233 for driving the focus lens 230) stored in the flash memory 242 of the digital camera 1 via the communication interface 354, and then stores the lens data in the flash memory 353.

The liquid crystal monitor 356 is a display configured to display a screen instructed by the controller 351. The controller 351 displays a rotation operation amount (positional information and movement amount) on the liquid crystal monitor 356 as operation information regarding rotation operation of the rotation operation member 357. Accordingly, the user can visually see the operation amount of the rotation operation.

The communication interface 354 is a wireless or wired communication interface. In the present embodiment, the controller 351 is capable of transmitting a command (instruction signal) for controlling the digital camera 1 to the communication interface 142 of the camera body 100 by USB communication via the communication interface 354 by using Picture Transfer Protocol (PTP).

The rotation operation member 357 is an input device to accept the rotation operation of the user. The rotation operation member 357 transmits the operation information corresponding to an accepted rotation operation of the user to the rotation detector 358. The rotation detector 358 obtains an output voltage corresponding to the rotation operation amount, and then transmits this output signal to the controller 351.

The controller 351 acquires the output signal from the rotation detector 358 at a fixed period (for example, 4 msec) to calculate rotation angle information (rotation angle θ [rad]) and rotation angular velocity information (ω=θ/4 [rad/msec]). Reflecting this calculation result by using the rotation angle information and the rotation angular velocity information stored in the flash memory 353 periodically (for example, every 100 msec) according to the rotation operation of the rotation operation member 357, the controller 351 generates a command (drive instruction information). The controller 351 communicates with the camera controller 140 of the digital camera 1 by transmitting the command to the communication interface 142 of the digital camera 1 via the communication interface 354.

2. Operation

2-1. Outline of Remote Operation

First, an outline of the remote operation will be described.

Figure 4:
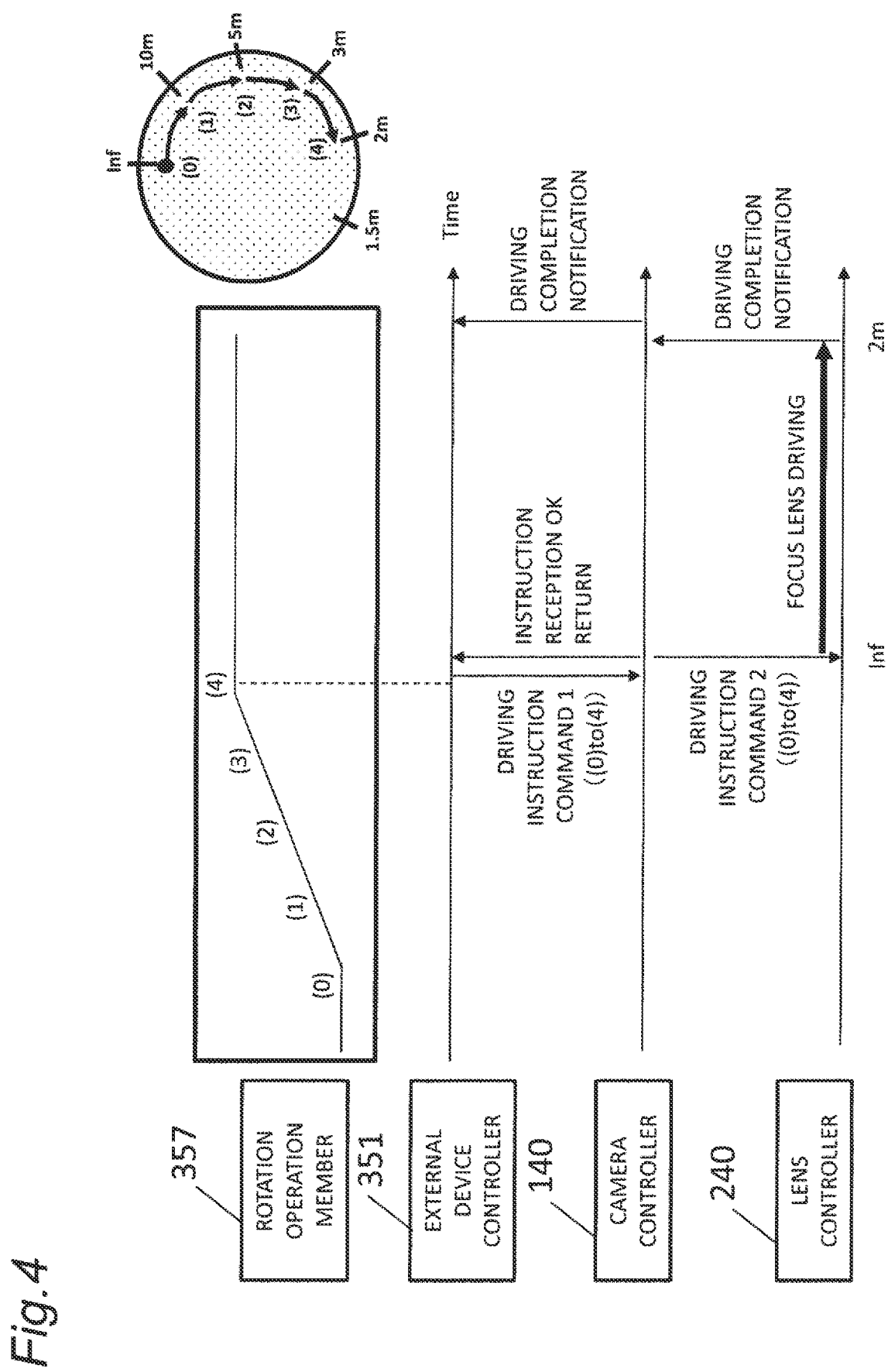
FIG. 4 is a sequence diagram illustrating from generation of a driving instruction command to completion of lens driving control, where a target position is not updated.

FIG. 4 is a sequence diagram illustrating from generation of a driving instruction command to completion of lens driving, where a target position is not updated. Not-updating of the target position means that the controller 351 of the external device 300 does not issue a driving instruction command until operation of the rotation operation member 357 is completed. For the sake of convenience, rotation operation amounts for setting predetermined focus distances (10 m, 5 m, 3 m, 2 m, and 1.5 m) of the digital camera 1 are represented on the rotation operation member 357. A focus distance of "10 m" means that a distance from the digital camera 1 to the subject to be focused is 10 m. For example, the user performs the rotation operation of the rotation operation member 357 up to a position indicating 10 m (focus adjustment position (1)) in order to set the focus distance of the digital camera 1 to 10 m. In FIG. 4, a rotation position of the rotation operation member 357 is represented by (0) to (4), and the rotation positions (1) to (4) correspond to the focus adjustment positions (1) to (4), respectively. The same applies to the following diagrams.

In the case of FIG. 4, when the rotation position reaches the position corresponding to the focus distance 2 m (focus adjustment position (4)) at which the operation of the rotation operation member 357 is completed, the controller 351 issues a driving instruction command 1 for driving the focus lens 230 such that the focus distance becomes 2 m from an infinite end (Inf) for the first time. When the driving instruction command 1 is accepted, the controller 140 of the camera returns an instruction reception OK and issues a driving instruction command 2 to the lens controller 240. The lens controller 240 accepts the driving instruction command 2 and then drives the focus lens 230 such that the focus distance is 2 m from the infinite end (Inf). After driving of the focus lens 230 is completed, the lens controller 240 transmits a driving completion notification to the camera controller 140, and then the camera controller 140 receives the driving completion notification and sends it to the controller 351 of the external device.

As described above, when the target position is not updated in FIG. 4, since the controller 351 of the external device 300 does not issue a command until the operation of the rotation operation member 357 is completed, thereby generating a time lag. In the present embodiment, a driving method to update the target position in order to eliminate this time lag is used.

Figure 5:
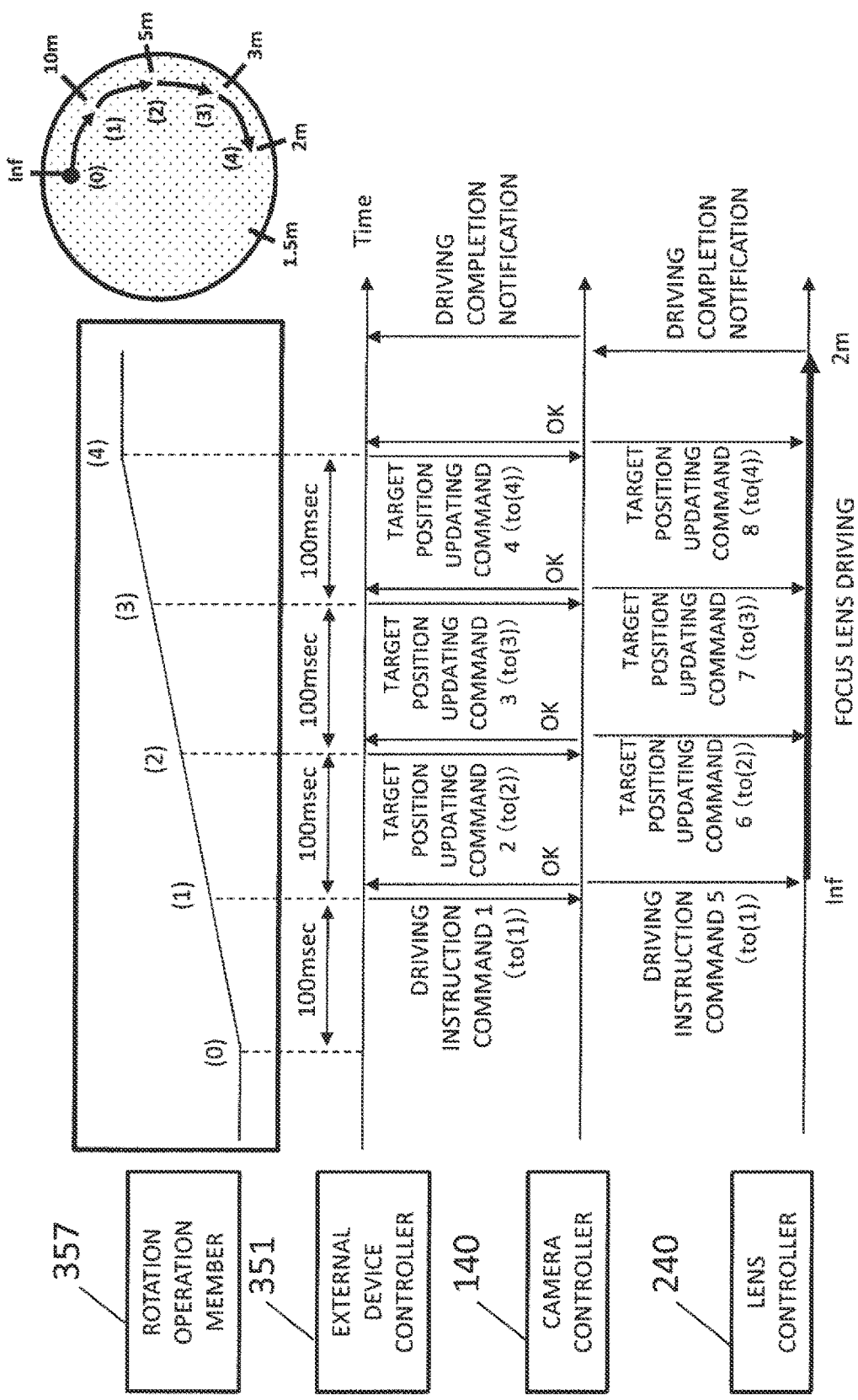
FIG. 5 is a sequence diagram illustrating from generation of a driving instruction command to completion of lens driving control, where the target position is updated.

FIG. 5 is a sequence diagram illustrating from generation of a driving instruction command to completion of lens driving, where a target position is updated. Updating of the target position means that the controller 351 of the external device 300 issues a command to update a drive position at a predetermined period before the operation of the rotation operation member 357 is completed. For explanation, any adjacent rotation operation amounts of the rotation operation member 357 between Inf (focus adjustment position (0)), focus distance 10 m (focus adjustment position (1)), 5 m (focus adjustment position (2)), 3 m (focus adjustment position (3)), 2 m (focus adjustment position (4)), and 1.5 m are set to the same.

FIG. 5 illustrates a case where the user performs the rotation operation of the rotation operation member 357 at a constant speed, and also the controller 351 issues commands 1 to 4 (driving instruction command 1 and target position updating commands 2 to 4) at the focus adjustment positions (1) to (4), respectively.

When the operation of the rotation operation member 357 reaches the position corresponding to the focus distance 10 m (focus adjustment position (1), first position), the controller 351 issues the driving instruction command 1 for driving the focus lens 230 such that the focus distance becomes 10 m from the infinite end (Inf). The driving instruction command 1 includes information on the focus adjustment position (1) as the target position. When the driving instruction command 1 is accepted, the camera controller 140 of the digital camera 1 returns an instruction reception OK and also issues driving instruction command 5 to the lens controller 240. The lens controller 240 accepts the driving instruction command 5 and drives the focus lens 230 such that the focus distance becomes 10 m from the infinite end (Inf). Subsequently, when the operation of the rotation operation member 357 reaches the position corresponding to the focus distance 5 m (focus adjustment position (2), second position), the controller 351 issues target position updating command 2 which is a correction command for driving the focus lens 230 such that the focus distance becomes 5 m. The target position updating command 2 includes information on the focus adjustment position (2) as the target position. When the target position updating command 2 is accepted, the camera controller 140 of the digital camera 1 returns an instruction reception OK and issues target position updating command 6 to the lens controller 240. The lens controller 240 accepts the target position updating command 6 and updates a target so as to drive the focus lens 230 to the focus distance 5 m. Subsequently to this operation, the driving of the focus lens 230 is completed to the position corresponding to focus distance of 2 m (focus adjustment position (4)), and then the lens controller 240 transmits a driving completion notification to the camera controller 140. The camera controller 140 receives the driving completion notification, and sends the driving completion notification to the controller 351 of the external device 300.

As described above, the driving method illustrated in FIG. 5 is more effective in eliminating the time lag than the driving method illustrated in FIG. 4. In the example illustrated in FIG. 5, each of commands 1 to 8 includes information on the target position, but does not include information on a start position. The same applies to the following examples.

Figure 6:
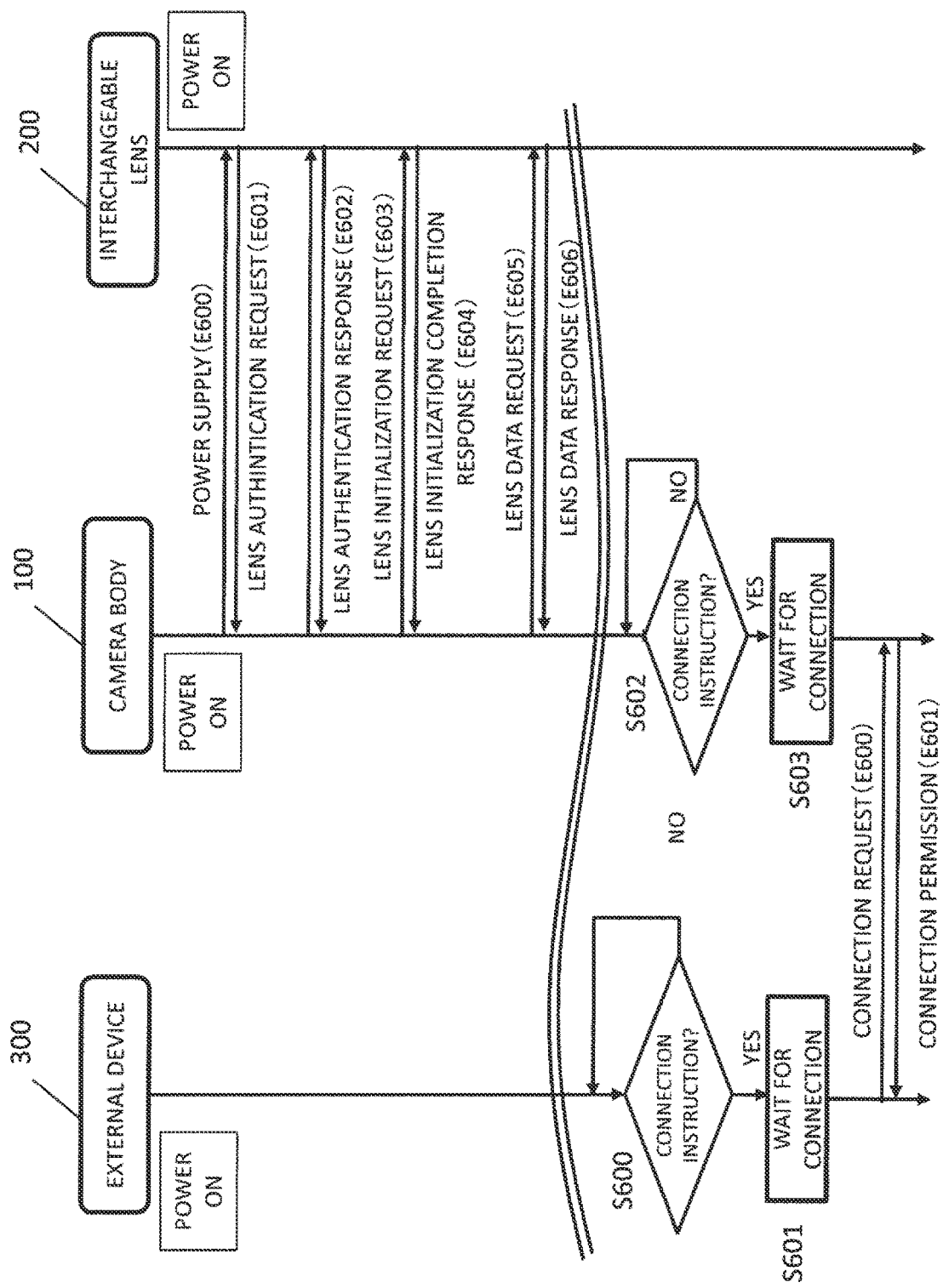
FIG. 6 is a sequence diagram related to an acquisition operation of lens data by a camera body 100 and a connection operation between the camera body 100 and the external device 300.

2-2. Acquisition of Lens Data by Camera Body and Connection Between Digital Camera and External Device FIG. 6 is a sequence diagram related to an acquisition operation of the lens data (lens information and performance data) by the camera body 100 and a connection operation between the camera body 100 and the external device 300. In the present embodiment, the connection operation between the camera body 100 and the external device 300 is achieved by USB communication using Picture Transfer Protocol (PTP).

Below, an acquisition operation of the lens data by the camera body 100 will be described with reference to FIG. 6.

When the power supply is turned on, the camera controller 140 of the camera body 100 supplies power to each component of the camera body 100, and enables the camera body 100 to perform imaging and communication. Thereafter, the camera controller 140 starts the power supply from the power supply 160 to the interchangeable lens 200 from the camera body 100 via the body mount 150 and the lens mount 250 (E600). Subsequently, the camera controller 140 and the lens controller 240 performs a lens authentication request (E601), a lens authentication response (E602), a lens initialization request (E603), and a lens initialization completion response (E604) with each other, and then the camera controller 140 issues a lens data request to the lens controller 240 (E605). The camera controller 140 accepts a lens data response sent from the lens controller 240 (E606), and then acquires the lens data that has been stored in the flash memory 242 of the interchangeable lens 200. The camera controller 140 stores the acquired lens data in the flash memory 143 of the camera body 100. The lens data is performance data indicating performance related to the driving of the focus lens 230. Details of the lens data will be described later.

Next, a connection operation (that is, initial communication) between the camera body 100 and the external device 300 will be described with reference to FIG. 6. An operation related to the external device 300 will be described below. When the power supply is turned on, the controller 351 of the external device 300 supplies the power of the power supply 360 to each component of the external device 300, and enables the external device 300 to perform communication. The user selects a menu for issuing a communication start instruction by operating the operation member 359 of the external device 300. When the user selects the menu for issuing the communication start instruction (S600), the external device 300 becomes a standby state waiting for connection from the camera body 100 (S601).

Next, an operation related to the digital camera 1 will be described. After the power supply is turned on, the user operates the operation member 130 of the camera body 100 to display the menu screen on the liquid crystal monitor 120. The user selects a menu for issuing a communication start instruction by operating a touch panel on the liquid crystal monitor 120. When the user selects the menu for issuing the communication start instruction (S602), the camera body 100 becomes a state of starting the connection to the external device 300 (S603).

The controller 351 of the external device 300 notifies the camera controller 140 of the digital camera 1 of a connection request via the communication interface 354 (E600). When the connection request is accepted, the camera controller 140 of the digital camera 1 notifies the external device 300 of a connection permission via the communication interface 142 (E601). Accordingly, communication between the digital camera 1 and the external device 300 is established.

2-3. Data Request Communication from External Device

Figure 7:
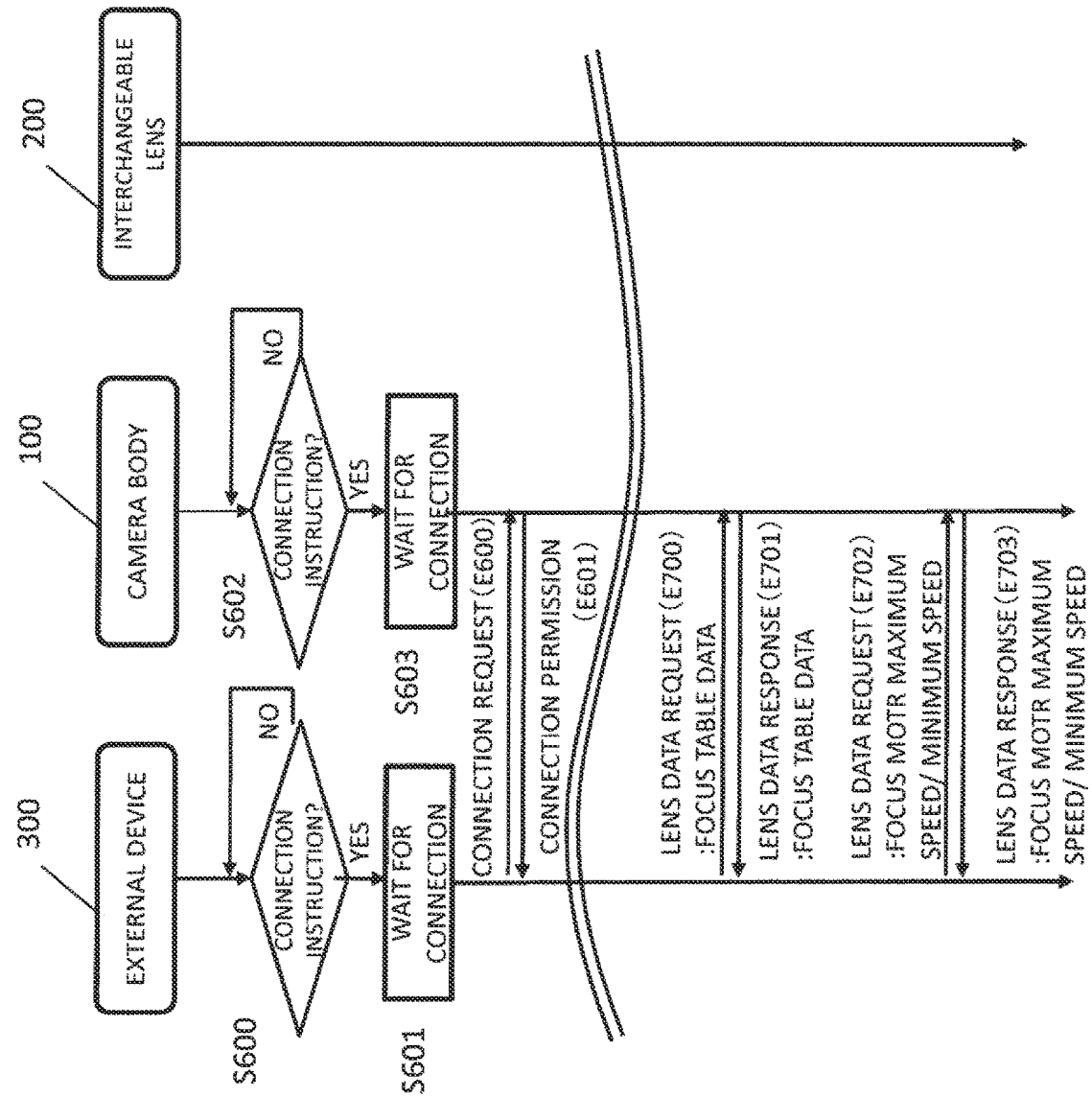
FIG. 7 is a sequence diagram related to a request operation of the lens data from the external device 300 to the digital camera 1.

FIG. 7 is a sequence diagram related to a request operation of the lens data from the external device 300 to the digital camera 1.

After the communication between the digital camera 1 and the external device 300 is established through the above initial communication, a request operation of the lens data (or camera information) from the external device 300 to the digital camera 1 is performed, which will be described with reference to FIG. 7 below.

The controller 351 of the external device 300 issues a lens data request to the camera body 100 in response to button press of the operation member 359 as an operation for acquiring the lens data in the digital camera 1 (E700). The lens data request is a request for acquiring focus table data and information regarding a communication period of the digital camera 1 (camera body 100) to communicate with external equipment. Although the lens data request is issued to the camera body 100 according to the button press of the operation member 359 by the user after the communication is established between the digital camera 1 and the external device 300, the present embodiment is not limited thereto. For example, the controller 351 of the external device 300 may automatically acquire the focus table data, the information regarding the communication period of the camera body 100, and the like immediately after the communication is established between the external device 300 and the digital camera 1. When the camera controller 140 receives the lens data request, the controller 351 of the external device 300 accepts a lens data response sent from the camera controller 140 (E701), and then acquires the focus table data and the information regarding the communication period which has been stored in the flash memory 143 of the camera body 100. Although the controller 351 of the external device 300 acquires the focus table data and the information regarding the communication period of the camera body 100 by issuing the lens data request, a request for the focus table data and a request for the information regarding the communication period of the camera body 100 may be separately issued.

Subsequently, the controller 351 of the external device 300 issues a lens data request to the camera body 100 for acquiring information regarding a maximum speed and a minimum speed for driving the focus motor (E702). When the camera controller 140 receives the lens data request, the controller 351 of the external device 300 accepts a lens data response sent from the camera controller 140 (E703), and then acquires the information on the maximum speed and the minimum speed of the focus motor (focus lens driver 233), which has been stored in the flash memory 143 of the camera body 100. The controller 351 stores in the flash memory 353 the acquired focus table data and the acquired maximum speed information and minimum speed information for driving the focus motor (driving ability information of the focus lens driver 233; focus speed information).

As stated above, the external device 300 is able to acquire the focus table data and the focus speed information stored in the flash memory 242 of the interchangeable lens 200 of the digital camera 1 before the remote operation. Here, examples of the focus table data and the focus speed information as the lens data are illustrated in FIGS. 8A and 8B, respectively.

FIG. 8A illustrates the focus table data. In FIG. 8A, numbers of steps of the focus motor are illustrated until reaching focus distances (infinite end (Inf), 10 m, 5 m, 3 m, 2 m . . . 0.9 m) to the subject to be focused with the focus lens 230 for any of focal lengths 14 mm, 25 mm, and 50 mm. FIG. 8B illustrates the focus speed information. FIG. 8B illustrates the maximum speed information and the minimum speed information for driving the focus motor.

2-4. Remote Focus Operation of Digital Camera by External Device (when Focus Speed is not Designated)

A remote focus operation of the digital camera 1 by the external device 300 will be described with reference to FIGS. 9A, 9B, and 9C.

Figure 9A:
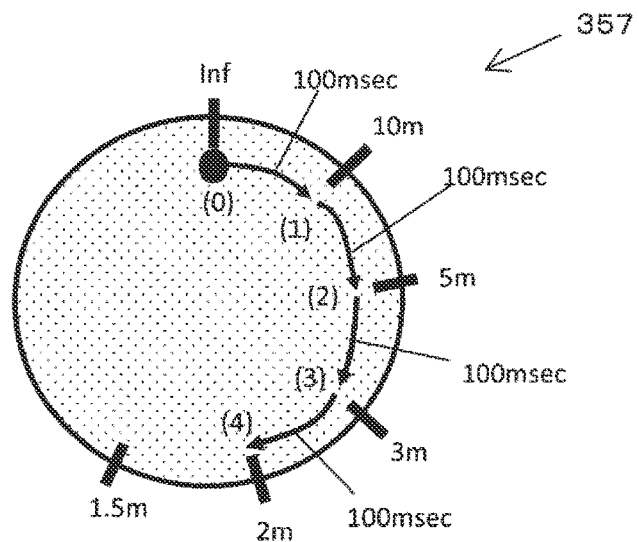
FIG. 9A is a diagram for describing a rotation operation of a rotation operation member 357.
Figure 9B:
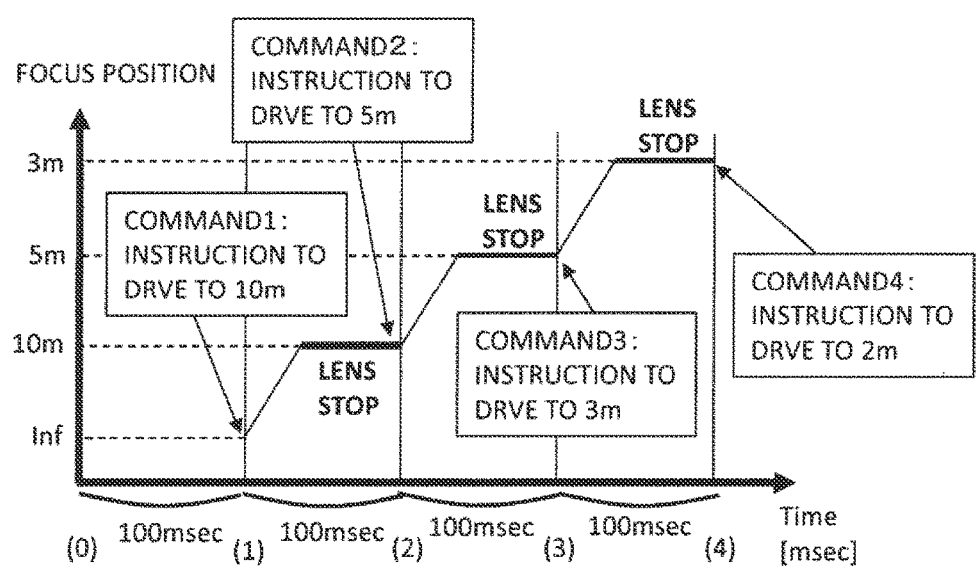
FIG. 9B is a graph representing a driving state of a focus lens 230 over time when a focus speed is not designated.

FIG. 9A is a diagram for describing a rotation operation of the rotation operation member 357, and FIG. 9B is a graph representing a driving state of the focus lens 230 over time. FIG. 9C is a graph including the graph of FIG. 9B and the graph of FIG. 5 added thereto.

In this example, designation of the focus speed is not included in a command for the remote focus operation from the external device 300.

FIG. 9A shows the rotation operation member 357 in a similar way to FIGS. 4 and 5. In this example, the user performs the rotation operation for the rotation operation member 357 at a constant speed as in FIG. 5, and commands 1 to 4 (driving instruction command 1 and target position updating commands 2 to 4) are issued at focus distance 10 m (focus adjustment position (1)), 5 m (focus adjustment position (2)), 3 m (focus adjustment position (3)), and 2 m (focus adjustment position (4)). In this example, the communication period from the external device 300 to the digital camera 1 is 100 msec and the rotation operation member 357 of the external device 300 is operated at the speed illustrated in FIG. 9A. That is, as illustrated in FIG. 9B, commands 1 to 4 for driving the focus lens such that the focus distance becomes positions of 10 m, 5 m, 3 m, and 2 m are issued at every 100 msec. The communication period from the external device 300 to the digital camera 1 can be set by using the information regarding the communication period of the camera body 100 with the external equipment, which has been stored in the flash memory 353 of the external device 300 illustrated in FIG. 3.

As described above, the target position updating commands 2 to 4 can be transmitted at every 100 msec which is the communication period of the camera body 100, and thus, the focus lens 230 can be driven while updating the target position of the focus lens 230 during the operation of the rotation operation member 357, that is, during the driving control of the focus lens 230.

Figure 9C:
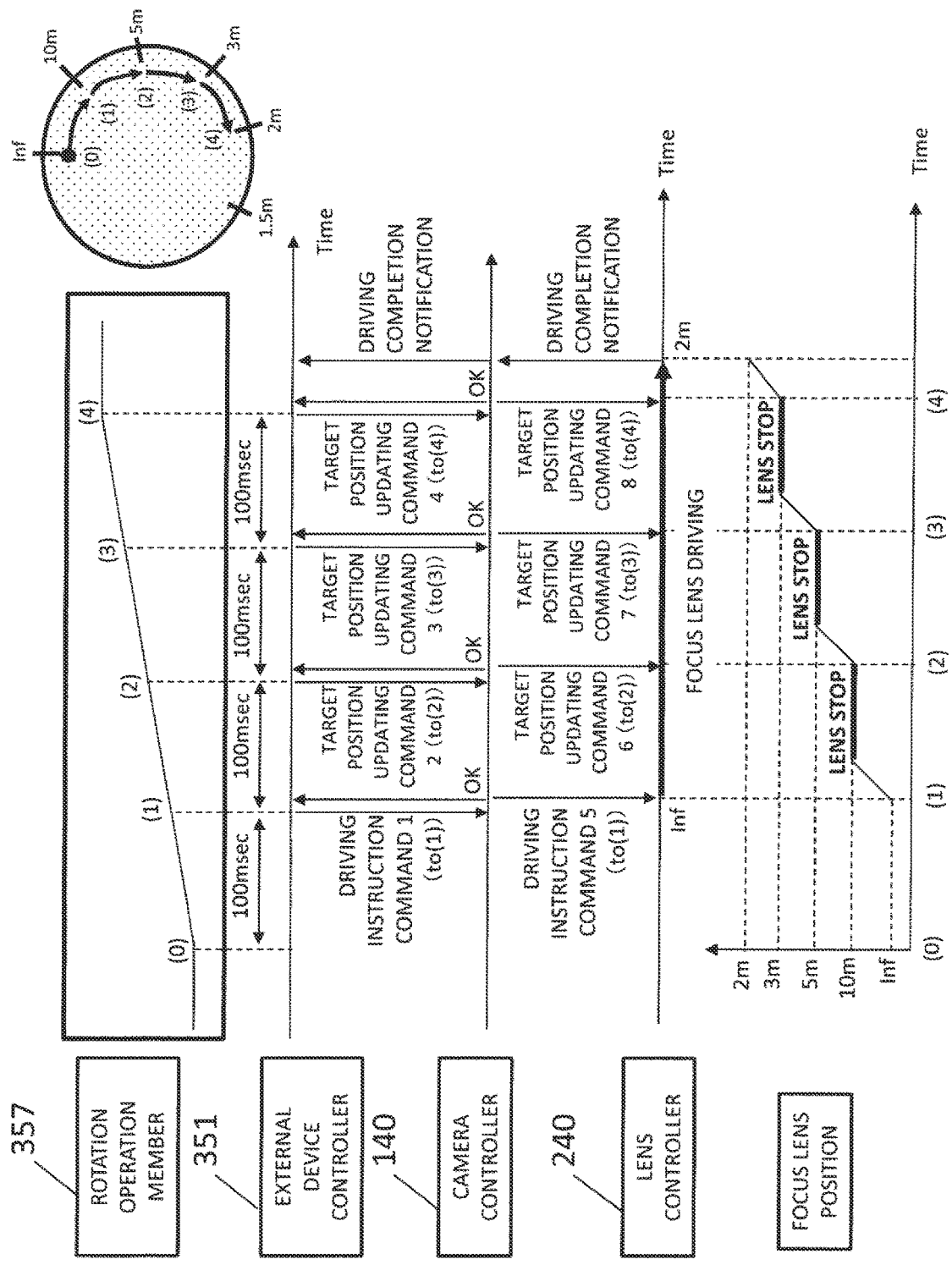
FIG. 9C is a diagram illustrating the graph of FIG. 9B and the graph of FIG. 5 added thereto.

In the examples illustrated in FIGS. 9A to 9C, when the remote focus operation of the digital camera 1 is performed by the external device 300, the digital camera 1 drives the focus lens 230 so as to reach a designated position in a shortest time without including in commands 1 to 4 the focus speed designation for driving the focus lens. Thus, as illustrated in FIGS. 9B and 9C, stop sections of the focus lens 230 occurs, thereby achieving an intermittent remote focus operation in which "drive" and "stop" are repeated.

Figure 10A:
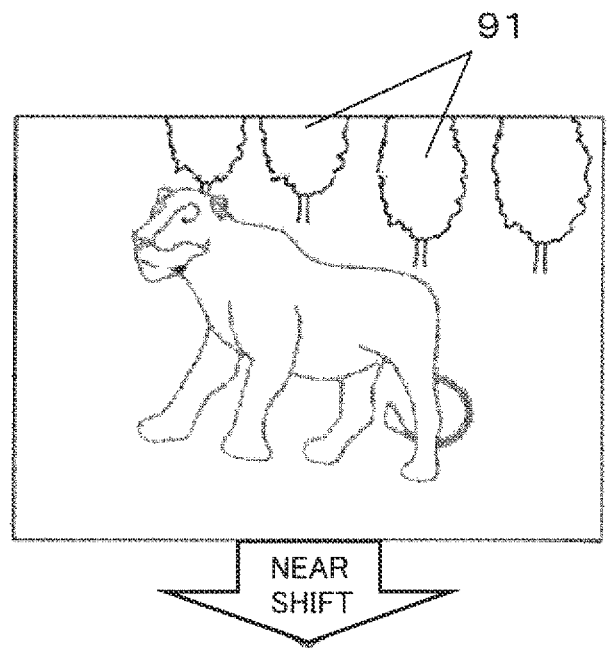
FIG. 10A is an explanatory diagram illustrating a case where a focus operation is performed from a specific scene to another specific scene.
Figure 10B:
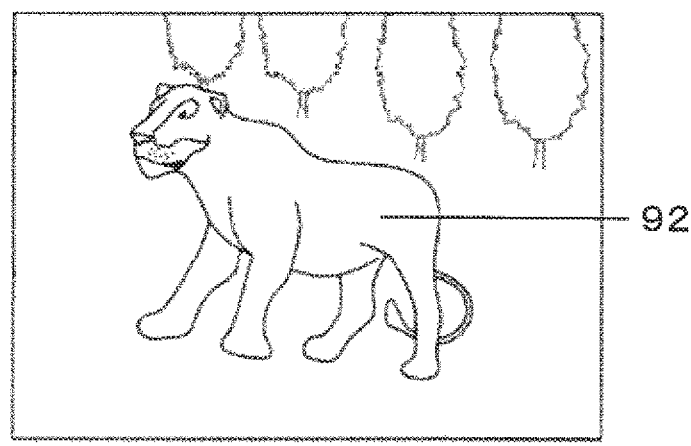
FIG. 10B is an explanatory diagram illustrating a case where the focus operation is performed from the specific scene to another specific scene.

Below, a remote focus operation from the external device 300 including designation of the focus speed will be described. This method can achieve a smoother focus operation, and for example, a cut video in a desired focus state can be captured when the user captures a specific scene of a movie. Thus, smooth capturing without interruption can be achieved, for example, when capturing after a scene illustrated in FIG. 10A (a state of being focused on a tree 91 in the background) is captured, a scene illustrated in FIG. 10B (a state of being focused on an animal 92 in front) obtained by near-shifting the focus lens 230 in a direction for shortened focus distance.

With reference to FIGS. 11A to 13, a case where the focus speed is designated in the remote focus operation from the external device 300 will be described.

2-5. Remote Focus Operation of Digital Camera by External Device (when Focal Speed is Designated)

Figure 11A:
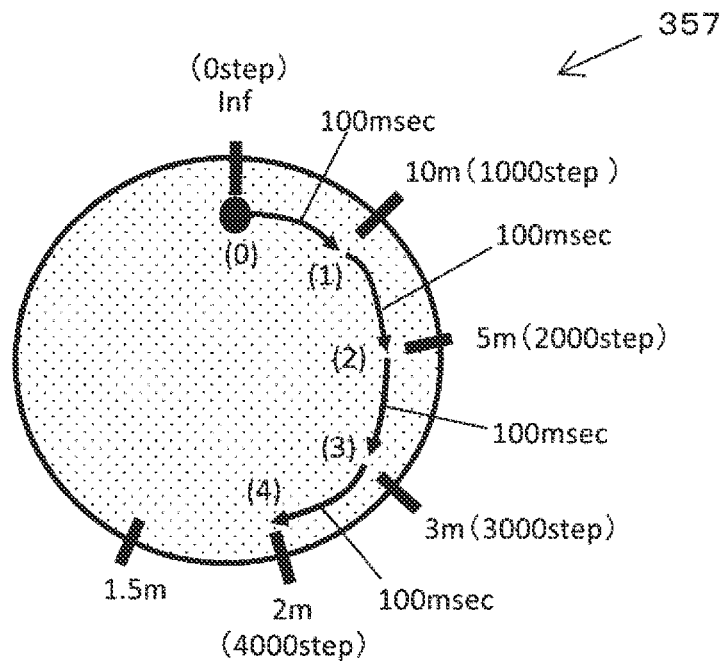
FIG. 11A is a diagram for describing the rotation operation of the rotation operation member 357.
Figure 11B:
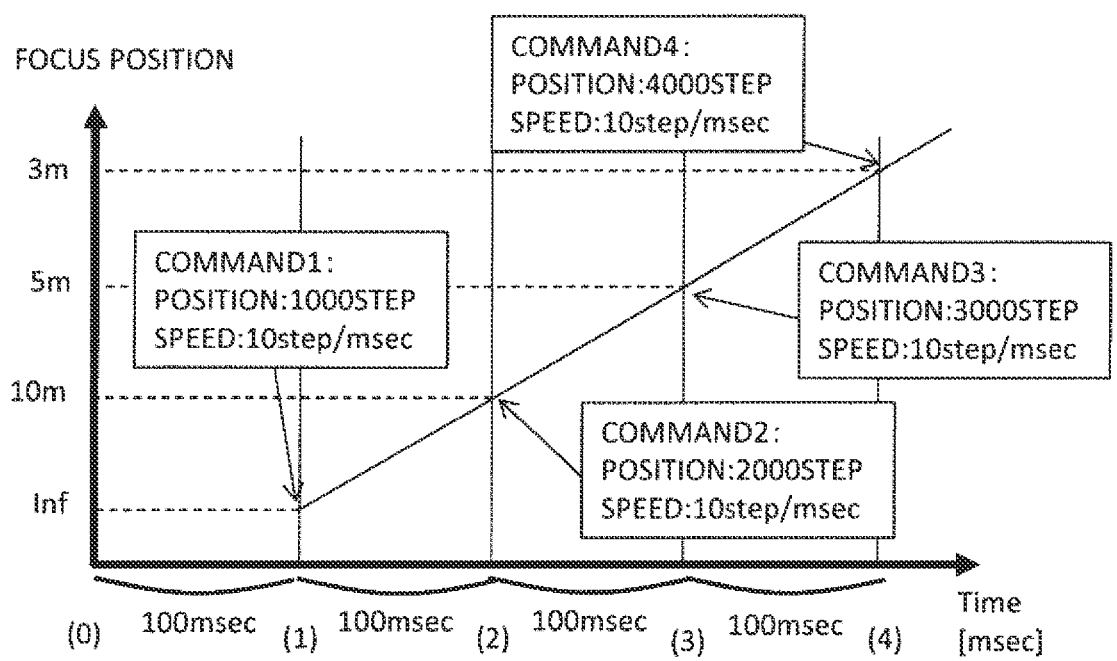
FIG. 11B is a graph representing a driving state of the focus lens 230 over time when the focus speed is designated.
Figure 11C:
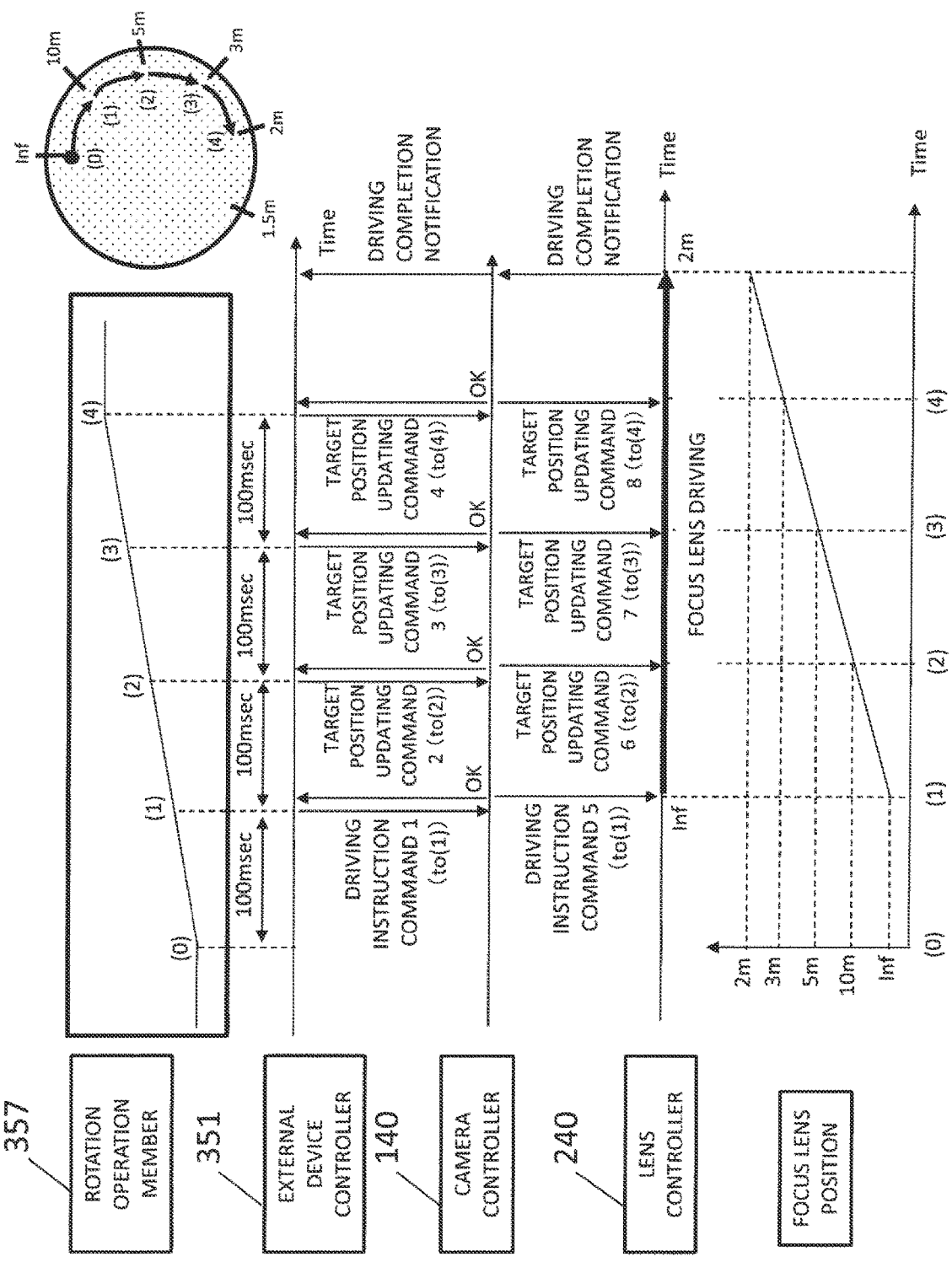
FIG. 11C is a diagram illustrating the graph of FIG. 11B and the graph of FIG. 5 added thereto.

FIG. 11A is a diagram for describing the rotation operation of the rotation operation member 357. FIG. 11B is a graph representing a driving state of the focus lens 230 over time. FIG. 11C is a graph including the graph of FIG. 11B and the graph of FIG. 5 added thereto.

In a first example illustrated in FIGS. 11A to 11C, the communication period from the external device 300 to the digital camera 1 is 100 msec and the rotation operation member 357 of the external device 300 is operated at the speed illustrated in FIG. 11A (each section of the focus adjustment positions (0) to (4) is operated in 100 msec). Further, a speed range of driving the lens is maximum speed: 30 step/msec and minimum speed: 3 step/msec.

In this example, since the focus speed is designated, commands 1 to 4 (driving instruction command 1 and target position updating commands 2 to 4) including the focus speed are issued at every 100 msec from the controller 351 of the external device 300 as illustrated in FIG. 11B. First command 1 includes a position designation (first position): 1000 step and a speed designation (first speed): 10 step/msec toward the focus distance of 10 m. Second command 2 includes a position designation (second position): 2000 step and a speed designation (second speed): 10 step/msec toward the focus distance of 5 m. Third command 3 includes a position designation (third position): 3000 step and a speed designation (third speed): 10 step/msec toward the focus distance of 3 m. The position designations and the speed designations can be included by utilizing the lens data stored in the flash memory 353 of the external device 300 illustrated in FIG. 8.

As described above, when the remote focus operation of the digital camera 1 is performed by the external device 300, commands 1 to 4 include the position designation and the speed designation for driving the focus lens, and thus continuous driving can be performed without stopping the focus lens 230. Thus, a smooth focus operation can be achieved.

Next, a second example of the remote focus operation of the digital camera 1 by the external device 300 when the focus speed is designated will be described with reference to FIGS. 12A to 12C.

Figure 12A:
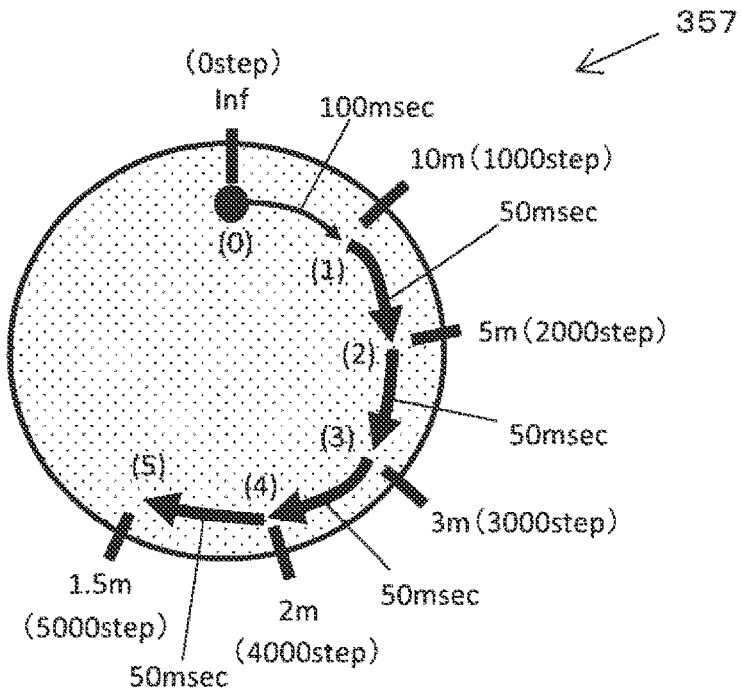
FIG. 12A is a diagram for describing the rotation operation of the rotation operation member 357.

FIG. 12A is a diagram for describing the rotation operation of the rotation operation member 357. FIG. 12B is a graph representing a driving state of the focus lens 230 over time. FIG. 12C is a graph illustrating the graph of FIG. 12B and the graph of FIG. 5 added thereto.

In the second example, the communication period from the external device 300 to the digital camera 1 is 100 msec and the rotation operation member 357 of the external device 300 is operated at the speed illustrated in FIG. 12A (each section of the focus adjustment positions (0) to (5) is operated in 100 msec or 50 msec). The speed range for driving the lens is maximum speed: 30 step/msec and minimum speed: 3 step/msec. In this example, unlike the first example, the rotation operation member 357 is operated faster from the middle.

Figure 12B:
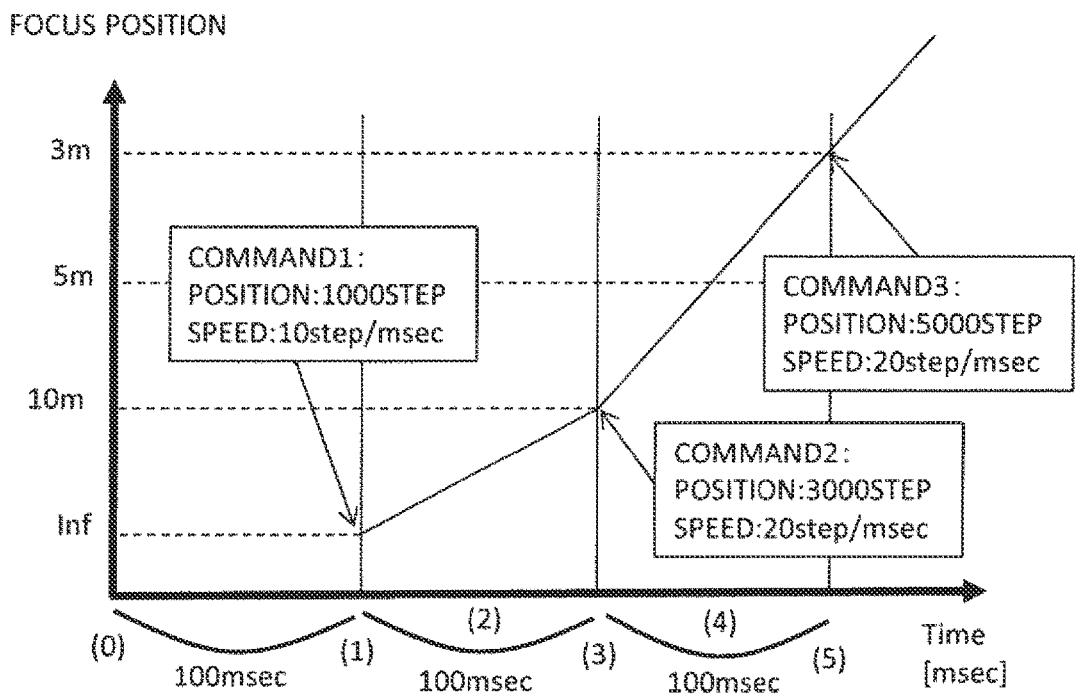
FIG. 12B is a graph representing the driving state of the focus lens 230 over time when the focus speed is designated.

In this example, the focus speeds are designated, and commands 1 to 3 including the focus speeds can be issued from the controller 351 of the external device 300 at every 100 msec as illustrated in FIG. 12B.

This example of the remote focus operation of the digital camera 1 by the external device 300 will be described with reference to FIGS. 12A to 12C.

In this example, the interchangeable lens 200 including the focus lens 230 having a focal length of 14 mm is attached to the camera body 100. Also, the lens data illustrated in FIGS. 8A and 8B is stored in the flash memory 353 of the external device 300 in advance by the communication between the external device 300 and the camera body 100 as illustrated in FIG. 7.

The controller 351 of the external device 300 calculates the rotation angle information and the rotation angular velocity information at every 100 msec by acquiring the output signal from the rotation detector 358 at a fixed period (for example, 4 msec). Using these calculation results and the lens data of FIGS. 8A and 8B, the controller 351 further obtains the number of drives (number of steps) and a driving speed (step/msec) of the focus lens driver 233.

Based on the rotation operation of the rotation operation member 357 of the user illustrated in FIG. 12A, the controller 351 calculates the number of drives and the driving speed of the focus lens driver 233 as follows.

(1) By the initial period 100 msec, the rotation operation member 357 moves from the focus adjustment position (0) to the focus adjustment position (1), and then the controller 351 calculates the number of drives to 1000 step as the position designation and the driving speed as (1000-0) step/100 msec=10 step/msec as the speed designation toward the focus distance of 10 m while referring to FIG. 8A. Thereafter, the controller 351 generates the first command 1 including the position designation: 1000 step and the speed designation: 10 step/msec toward the focus distance of 10 m.

(2) After the next period 100 msec, the rotation operation member 357 moves to the focus adjustment position (3), and then the controller 351 calculates the number of drives to 3000 step as the position designation and the driving speed to (3000-1000) step/100 msec=20 step/msec as the speed designation toward the focus distance of 3 m while referring to FIG. 8A. Thereafter, the controller 351 generates second command 2 including the position designation: 3000 step and the speed designation: 20 step/msec toward the focus distance of 3 m.

(3) After the last period 100 msec, the rotation operation member 357 moves to the focus adjustment position (5), the controller 351 sets the number of drives to 5000 step as the position designation and the driving speed to (5000-3000) step/100 msec=20 step/msec as the speed designation toward the focus distance of 1.5 m while referring to FIG. 8A. Thereafter, the controller 351 generates third command 3 including the position designation: 5000 steps and the speed designation: 20 steps/msec toward the focus distance of 1.5 m.

In the above-described example, generated commands 1 to 3 includes the driving speeds of 10 step/msec and 20 step/msec, which fall within the maximum speed (30 step/msec) and the minimum speed (3 step/msec) for driving the focus motor illustrated in FIG. 8B. Thus, the focus lens 230 can be driven normally.

When the driving speed is calculated to exceed the maximum speed for driving the focus motor, the controller 351 decides the driving speed to be equal to or less than the maximum speed for driving the focus motor. Similarly, when the driving speed is calculated to be lower than the minimum speed for driving the focus motor, the controller 351 decides the driving speed to be equal to or higher than the minimum speed for driving the focus motor. That is, the driving speed to be included in the commands is decided to be limited in the range from the minimum speed to the maximum speed of the focus lens driver 233. As described above, the controller 351 generates the command including the speed designation reflected by the drive ability information of the focus lens driver 233.

Figure 13:
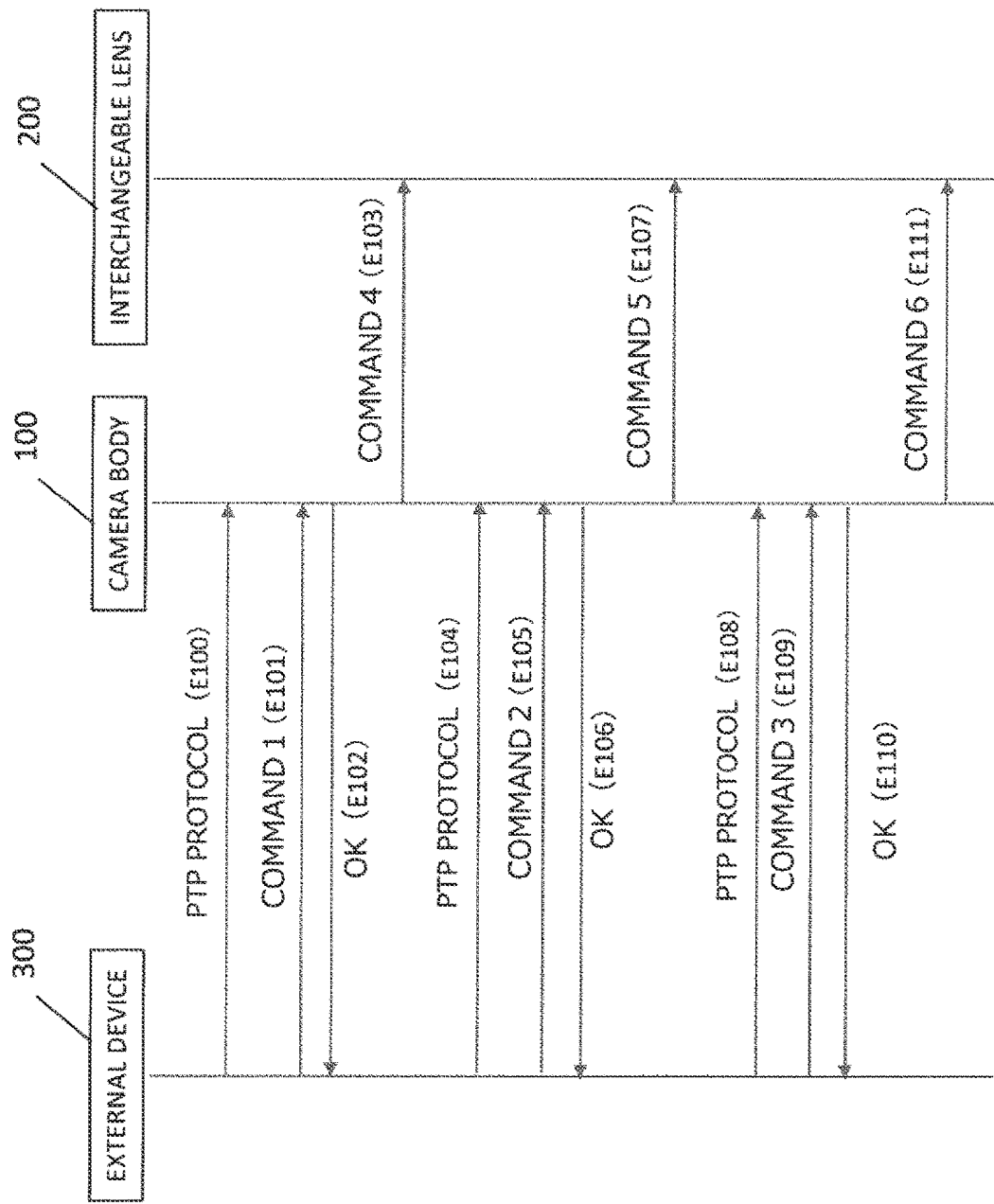
FIG. 13 is a sequence diagram for achieving a remote focus operation of the digital camera by the external device as a second example.

FIG. 13 is a sequence diagram for achieving the remote focus operation of the digital camera 1 by the external device 300 as a second example.

When communicating with the camera body 100, the controller 351 of the external device 300 performs predetermined PTP protocol processing (E100), and then transmits generated command 1 to the camera controller 140 via the communication interface 354 and the communication interface 142 of the camera body 100 (E101). The camera controller 140 accepts command 1 and returns information (OK information) indicating permission for the acceptance of the subsequent command to the controller 351 of the external device 300 via the communication interface 142 and the communication interface 354 (E102). As stated above, the camera controller 140 of the camera body 100 returns the above-described command acceptance permission (OK information) without waiting for the completion of the driving of the focus lens for command 1.

The camera controller 140 transmits command 4 corresponding to command 1 to the lens controller 240 of the lens unit 200. Thereafter, the lens controller 240 accepts command 4 and then issues an instruction to the focus lens driver 233 in response to command 4. The instruction causes the focus lens driver 233 to drive the focus lens 230 at a speed of 10 steps/msec toward the focus distance of 10 m. Subsequently, operations of communications (E104) to (E111) are similarly performed.

As described above, in the remote focus operation of the digital camera 1 by the external device 300, the position designation and the speed designation for driving the focus lens are included in commands 1 to 3 for drive instruction, thereby achieving continuous driving without stopping the focus lens 230. Driving speed of the focus lens can be changed according to the rotation speed of the rotation operation member 357 of the external device 300. Using the remote focus operation of the present embodiment makes it possible to easily create a cut of scene as intended by the user.

1-3. Summary (Imaging Apparatus)

As described above, the digital camera 1 (imaging apparatus) in the present embodiment is an imaging apparatus capable of communicating with the external device 300 (external control device) and configured to capture the subject image formed through the focus lens 230 (optical member). The digital camera 1 includes the communication interface 142 configured to receive from the external device 300 the command related to driving of the focus lens 230, and the camera controller 140 (controller) configured to control the driving of the focus lens 230 based on the command. The camera controller 140 starts the driving of the focus lens 230 based on driving instruction command 1 (first command) received from the external device 300 by the communication interface 142. When the communication interface 142 receives from the external device 300 target position updating commands 2 to 4 (second commands) different from the driving instruction command 1 before completion of driving control of the focus lens 230, the camera controller 140 updates the target position as a target of driving the focus lens 230 based on target position updating commands 2 to 4.

According to the above-described digital camera 1, the target position is updated based on target position updating commands 2 to 4 before the completion of driving control of the focus lens 230, and thus the driving control of the focus lens 230 can be executed with updating the target position. Accordingly, it is easy to drive the focus lens 230 to the target position reflected by the intention of the user.

In the digital camera 1 of the present embodiment, when the driving control of the focus lens 230 is completed, the camera controller 140 transmits the driving completion notification to the external device 300 via the communication interface 142. When the communication interface 142 receives target position updating commands 2 to 4 before the driving completion notification is transmitted, the camera controller 140 updates the target position based on target position updating commands 2 to 4. Accordingly, the target position of the focus lens 230 can be updated before the driving completion notification is transmitted.

In the digital camera 1 of the present embodiment, driving instruction command 1 includes the first position as the target position, and target position updating command 2 includes the second position different from the first position as the target position. The camera controller 140 starts the driving of the focus lens 230 toward the first position based on driving instruction command 1. The camera controller 140 further updates the target position from the first position to the second position during the driving control of the focus lens 230 based on target position updating command 2. Accordingly, the focus lens 230 can be driven toward different positions based on driving instruction command 1 and the target position updating command 2.

In the digital camera 1 of the present embodiment, the camera controller 140 controls the driving speed of the focus lens 230 at the first speed based on driving instruction command 1 until the focus lens 230 reaches the first position. The camera controller 140 further controls the driving speed of the focus lens 230 at the second speed based on target position updating command 2 until the focus lens 230 reaches the second position after reaching the first position. Accordingly, the driving speed of the focus lens 230 can be controlled based on each of driving instruction command 1 and target position updating command 2.

In the digital camera 1 of the present embodiment, the communication interface 142 receives target position updating commands 2 to 4 from the external device 300 at each predetermined communication period after receiving driving instruction command 1. Based on each received target position updating commands 2 to 4, the camera controller 140 subsequently controls the driving of the focus lens 230. Accordingly, target position updating commands 2 to 4 are received at desired periods, each of which affects the driving control of the focus lens 230.

The digital camera 1 of the present embodiment further includes the flash memory 143 (storage) configured to store the lens data (performance data) indicating the performance related to the driving of the focus lens 230. The camera controller 140 transmits the lens data to the external device 300 via the communication interface 142, and driving instruction command 1 and target position updating commands 2 to 4 are set according to the lens data. Accordingly, the external device 300 can reflect the lens data in setting the commands.

The digital camera 1 of the present embodiment is further configured to be attachable with the interchangeable lens 200 thereto, and the focus lens 230 is an optical member provided on the interchangeable lens 200. Accordingly, the driving control using target position updating commands 2 to 4 can be applied to the focus lens 230 of the interchangeable lens 200.

(Control Device)

The external device 300 (control device) in the present embodiment is a control device capable of communicating with the digital camera 1 (imaging apparatus) configured to capture the subject image formed via the focus lens 230 (optical member). The external device 300 includes the dial part 320 (operation member) movable according to user operation, the controller 351 configured to generate the command related to the driving of the focus lens 230 according to the movement operation of the dial part 320, and the communication interface 354 configured to transmit the command to the digital camera 1. When the movement operation of the dial part 320 is started, the controller 351 generates driving instruction command 1 for starting the driving of the focus lens 230 and then transmits the driving instruction command to the digital camera 1 via the communication interface 354. During the movement operation of the dial part 320 being continued, the controller 351 further generates target position updating commands 2 to 4 for updating the target position as the target of driving the focus lens 230, and then transmits the target position updating commands to the digital camera 1 via the communication interface 354.

According to the above-described external device 300, target position updating commands 2 to 4 are transmitted to the digital camera 1 while the movement operation of the dial part 320 is being continued. Thus, the driving control of the focus lens 230 can be performed while updating the target position. Accordingly, it is easy to drive the focus lens 230 to the target position reflected with user intention.

In the external device 300 of the present embodiment, after driving instruction command 1 is transmitted, the communication interface 354 transmits target position updating commands 2 to 4 to the digital camera 1 before the driving completion notification is received from the digital camera 1. Accordingly, the target position of the focus lens 230 can be updated without waiting for receiving the driving completion notification.

In the external device 300 of the present embodiment, the controller 351 causes driving instruction command 1 to include the first position as the target position based on the operation amount of the dial part 320 when the movement operation is started. The controller 351 further causes target position updating command 2 to include the second position different from the first position as the target position based on the operation amount of the dial part 320 when the movement operation is being continued. Accordingly, the focus lens 230 can be driven toward different positions based on driving instruction command 1 and target position updating command 2.

The external device 300 of the present embodiment further includes the flash memory 353 configured to store the lens data indicating the performance related to the driving of the focus lens 230. The controller 351 causes driving instruction command 1 to include the first speed for driving the focus lens 230 to the first position based on the lens data and the operation amount of the dial part 320 when the movement operation is started. The controller 351 further causes target position updating command 2 to include the second speed for driving the focus lens 230 to the second position based on the lens data and the operation amount of the dial part 320 when the movement operation is being continued. Accordingly, the driving speed of the focus lens 230 can be controlled based on each of driving instruction command 1 and target position updating command 2.

In the external device 300 of the present embodiment, the controller 351 acquires the lens data (performance data) from the digital camera 1 via the communication interface 354, and then records the lens data in the flash memory 353. Accordingly, the controller 351 can reflect the lens data in setting the commands 1 to 4.

In the external device 300 of the present embodiment, the controller 351 generates target position updating commands 2 to 4 at each predetermined communication period based on the movement operation being continued after driving instruction command 1 is generated, and subsequently transmits the target position updating commands to the digital camera 1 via the communication interface 354. Accordingly, target position updating commands 2 to 4 are transmitted to the digital camera 1 at a predetermined communication period, each of which affects the driving control of the focus lens 230.

In the external device 300 of the present embodiment, the dial part 320 is rotatable for the movement operation. Accordingly, the user can easily operate the dial part.

(Imaging System)

The imaging system A in the present embodiment is an imaging system including the digital camera 1 (imaging apparatus) configured to capture the subject image formed via the focus lens 230 (optical member) and the external device 300 (control device) capable of communicating with the digital camera 1. The digital camera 1 includes the communication interface 142 configured to receive the command related to the driving of the focus lens 230 from the external device 300, and the camera controller 140 configured to control the driving of the focus lens 230 based on the command. The external device 300 includes the dial part 320 movable according to user operation, the controller 351 configured to generate the command according to the movement operation of the dial part 320, and the communication interface 354 configured to transmit the command to the digital camera 1. In the external device 300, when the movement operation of the dial part 320 is started, the controller 351 generates driving instruction command 1 for starting the driving of the focus lens 230 and then transmits the driving instruction command to the digital camera 1 via the communication interface 354. The controller 351 further generates the target position updating commands 2 to 4 for updating the target position as the target of the driving of the focus lens 230 during the movement operation being continued, and then transmits the target position updating commands to the digital camera 1 via the communication interface 354. In the digital camera 1, the camera controller 140 starts the driving of the focus lens 230 based on driving instruction command 1 received from the external device 300 via the communication interface 142. The camera controller 140 further updates the target position as the target of driving the focus lens 230 based on target position updating commands 2 to 4 when the communication interface 142 receives target position updating commands 2 to 4 from the external device 300 before the driving control of the focus lens 230 is completed.

According to the above-described imaging system A, the target position is updated based on target position update commands 2 to 4 before the completion of the driving control of the focus lens 230. Accordingly, it is easy to drive the focus lens 230 toward the target position reflected with user intention.

By the imaging system A of the present embodiment, the camera controller 140 in the digital camera 1 transmits the driving completion notification to the external device 300 via the communication interface 142 when the driving control of the focus lens 230 is completed, the communication interface 354 in the external device 300 transmits target position updating commands 2 to 4 to the digital camera 1 before the driving completion notification is received from the digital camera 1 after driving instruction command 1 is transmitted and, and the camera controller 140 in the digital camera 1 updates the target position based on target position updating commands 2 to 4 when the communication interface 142 receives target position updating commands 2 to 4 before the driving completion notification is transmitted. Accordingly, the target position of the focus lens 230 can be updated before the driving completion notification is transmitted.

Other Embodiments

The present disclosure is not limited to the above-described embodiment, and various embodiments can be considered.

Hereinafter, other embodiments of the present disclosure will be described.

In the above-described embodiment, the remote control is used for the focus operation. However, the remote control can be similarly used for the zoom operation or the stop operation. That is, the present disclosure is not limited to the driving control of the focus lens 230 as the optical member, and applicable to driving control of the zoom lens 210 or the stop 260. For example, once the zoom operation or the stop operation is selected with a dedicated button of the operation member 359 of the external device 300, the selected remote control can be achieved.

Figures 14A, 14B:
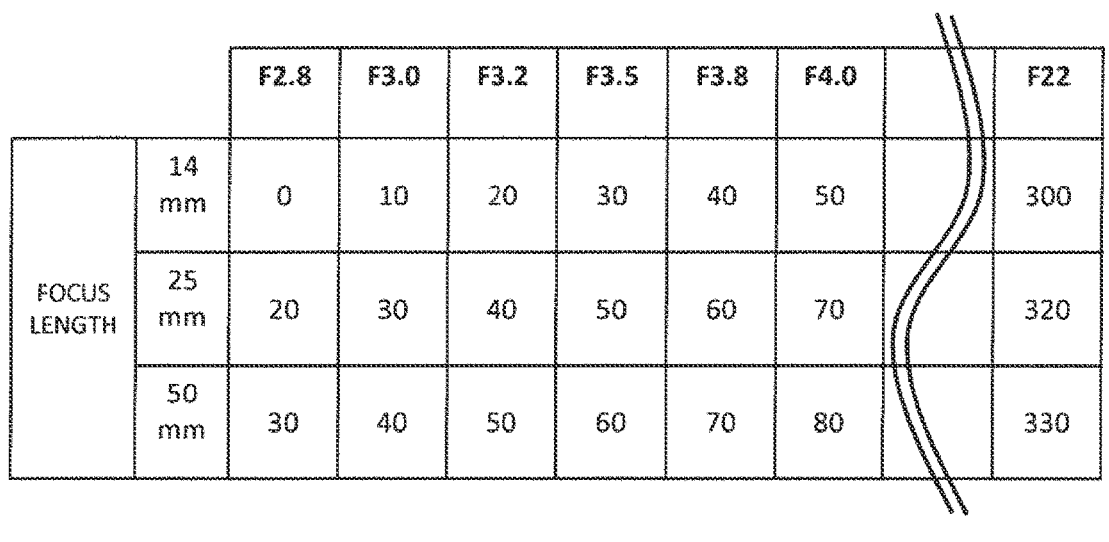
FIG. 14A is a diagram illustrating an example of stop table data as the lens data.
FIG. 14B is a diagram illustrating an example of stop speed information as the lens data.

FIGS. 14A and 14B show lens data used when the stop operation is selected as the remote control. FIG. 14A illustrates stop table data, including the number of steps of a stop motor until reaching F-numbers (F2.8, F3.0, F3.2, F3.5, F3.8, F4.0 . . . F22) of the stop 260 for any of the focal lengths of 14 mm, 25 mm, and 50 mm. FIG. 14B illustrates stop speed information, including maximum speed information and minimum speed information of the stop driver 262.

For generating the driving instruction command or the target position updating command related to driving of the stop 260, the stop table data illustrated in FIG. 14A is referred to calculate the position designation, and the stop speed information illustrated in FIG. 14B is referred to calculate the speed designation.

FIGS. 15A and 15B show lens data used when the zoom operation is selected as the remote control. FIG. 15A illustrates zoom table data, including the number of steps of a zoom motor until reaching the focal lengths (14 mm, 14.1 mm, 14.2 mm, 14.3 mm, 14.4 mm, 14.5 mm . . . 50 mm). FIG. 15B illustrates zoom speed information, including maximum speed information and minimum speed information of the zoom lens driver 211.

For generating the driving instruction command or the target position updating command related to driving of the zoom lens 210, the zoom table data illustrated in FIG. 15A is referred to calculate the position designation, and the zoom speed information illustrated in FIG. 15B is referred to calculate the speed designation.

Also, the digital camera 1 is not limited to the interchangeable lens type camera like the above-described embodiment, and a lens-integrated camera may also be applied.

Although the dial part 320 is used as the operation member of the external device 300 in the above-described embodiment, not limited to the rotatable operation member (dial part), a linear-slidable operation member may be applied.

Although the communication operation between the digital camera 1 and the external device 300 is achieved by the USB communication in the above-described embodiment, the camera controller 140 may communicate with the external device 300 by using Picture Transfer Protocol (PTP) by Bluetooth (registered trademark), a wireless LAN, a wired LAN, or the like via the communication interface 142.

Although instruction content from the controller 351 is displayed on the liquid crystal monitor 356 in the above-described embodiment, a driving result of the digital camera 1 based on the instruction content from the controller 351, that is, output value information from the digital camera 1 may be displayed.

Therefore, not only components which are essential for solving the problems but also components which are not essential for solving the problems in order to illustrate the aforementioned technology may be included in the components described in the accompanying drawings and detailed description. Thus, the fact that the non-essential components are described in the accompanying drawings and detailed description should not directly prove that the non-essential components are essential.

In addition, since the aforementioned preferred embodiments are provided in order to illustrate the technology of the present disclosure, various changes, replacements, additions, and omissions can be performed within the scope of the claims or the equivalents thereof.

The present disclosure can be applied to, for example, a digital camera 1 configured to capture an image, an external device 300 (communication equipment) capable of communicating with the digital camera 1 and configured to perform a remote operation for the digital camera 1, and an imaging system including the digital camera 1 and the external device 300. Specifically, the present disclosure is applicable to, for example, a cinema camera, a digital camera, and a movie camera capable of capturing a moving image as the digital camera 1.

What is claimed is:

1. An imaging apparatus capable of communicating with an external control device and configured to capture a subject image formed via an optical member, the imaging apparatus comprising:
a communication interface configured to receive from the control device a command related to driving of the optical member; and
a controller configured to control the driving of the optical member based on the command, wherein
the controller starts the driving of the optical member based on a first command received from the control device via the communication interface, and wherein
when the communication interface receives from the control device a second command different from the first command before completion of driving control of the optical member, the controller updates a target position as a target of driving the optical member based on the second command.

2. The imaging apparatus according to claim 1, wherein
the controller transmits a driving completion notification to the control device via the communication interface when the driving control of the optical member is completed, and wherein
when the communication interface receives the second command before the driving completion notification is transmitted, the controller updates the target position based on the second command.

3. The imaging apparatus according to claim 1, wherein
the first command includes a first position as the target position,
the second command includes a second position different from the first position as the target position, and
the controller starts the driving of the optical member toward the first position based on the first command, and updates the target position from the first position to the second position during the driving control of the optical member based on the second command.

4. The imaging apparatus according to claim 3, wherein
the controller controls a driving speed of the optical member at a first speed based on the first command until the optical member reaches the first position, and controls the driving speed of the optical member at a second speed based on the second command until the optical member reaches the second position after reaching the first position.

5. The imaging apparatus according to claim 1, wherein
the communication interface receives the second command from the control device at each predetermined communication period after receiving the first command, and
based on the each received second command, the controller subsequently controls the driving of the optical member.

6. The imaging apparatus according to claim 1, further comprising
a storage configured to store performance data indicating performance related to the driving of the optical member, wherein
the controller transmits the performance data to the control device via the communication interface, and
the first and second commands are set according to the performance data.

7. The imaging apparatus according to claim 1, further configured to be attachable with an interchangeable lens thereto, and
the optical member includes at least one of a focus lens, a zoom lens, and a stop in the interchangeable lens.

8. A control device capable of communicating with an imaging apparatus configured to capture a subject image formed via an optical member, the control device comprising:
an operation member movable according to user operation;
a controller configured to generate a command related to driving of the optical member according to a movement operation of the operation member; and a communication interface configured to transmit the command to the imaging apparatus, wherein when the movement operation of the operation member is started, the controller generates a first command for starting the driving of the optical member and then transmits the first command to the imaging apparatus via the communication interface, and wherein during the movement operation being continued, the controller generates a second command for updating a target position as a target of driving the optical member and then transmits the second command to the imaging apparatus via the communication interface.

9. The control device according to claim 8, wherein after the first command is transmitted, the communication interface transmits the second command to the imaging apparatus before a driving completion notification is received from the imaging apparatus.

10. The control device according to claim 9, wherein the controller causes the first command to include a first position as the target position based on an operation amount of the operation member when the movement operation is started, and the controller causes the second command to include a second position different from the first position as the target position based on an operation amount of the operation member when the movement operation is being continued.

11. The control device according to claim 10, further comprising a storage configured to store performance data indicating performance related to the driving of the optical member, wherein the controller causes the first command to include a first speed for driving the optical member to the first position based on the performance data and the operation amount of the operation member when the movement operation is started, and the controller causes the second command to include a second speed for driving the optical member to the second position based on the performance data and the operation amount of the operation member when the movement operation is being continued.

12. The control device according to claim 11, wherein the controller acquires the performance data from the imaging apparatus via the communication interface, and then records the performance data in the storage.

13. The control device according to claim 8, wherein the controller generates the second command at each predetermined communication period based on the movement operation being continued after the first command is generated, and subsequently transmits the second command to the imaging apparatus via the communication interface.

14. The control device according to claim 8, wherein the operation member is rotatable for the movement operation.

15. An imaging system comprising:
an imaging apparatus configured to capture a subject image formed via an optical member; and
a control device capable of communicating with the imaging apparatus, wherein
the imaging apparatus includes
a first communication interface configured to receive a command related to driving of the optical member from the control device, and
a first controller configured to control the driving of the optical member based on the command,
the control device includes
an operation member movable according to user operation,
a second controller configured to generate the command according to a movement operation of the operation member, and
a second communication interface configured to transmit the command to the imaging apparatus, wherein
when the movement operation of the operation member is started, the second controller in the control device generates a first command for starting the driving of the optical member and then transmits the first command to the imaging apparatus via the second communication interface, wherein
during the movement operation being continued, the second controller generates a second command for updating a target position as a target of driving the optical member and then transmits the second command to the imaging apparatus via the second communication interface, and
the first controller in the imaging apparatus starts the driving of the optical member based on the first command received from the control device via the first communication interface, and updates the target position as the target of driving the optical member based on the second command different from the first command when the first communication interface receives the second command from the control device before the driving control of the optical member is completed.

16. The imaging system according to claim 15, wherein the first controller in the imaging apparatus transmits a driving completion notification to the control device via the first communication interface when the driving control of the optical member is completed, the second communication interface in the control device transmits the second command to the imaging apparatus before the driving completion notification is received from the imaging apparatus after the first command is transmitted, and the first controller in the imaging apparatus updates the target position based on the second command when the first communication interface receives the second command before the driving completion notification is transmitted.

* * * * *